US010608733B2

(12) United States Patent
Ravishankar et al.

(10) Patent No.: US 10,608,733 B2
(45) Date of Patent: Mar. 31, 2020

(54) SYSTEM AND METHOD FOR GROUND BASED BEAM FORMING (GBBF) FOR VERY HIGH THROUGHPUT SATELLITE (VHTS) SYSTEMS

(71) Applicant: Hughes Network Systems, LLC, Germantown, MD (US)

(72) Inventors: Channasandra Ravishankar, Clarksburg, MD (US); John Corrigan, Chevy Chase, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 67 days.

(21) Appl. No.: 15/986,771

(22) Filed: May 22, 2018

(65) Prior Publication Data

US 2018/0337724 A1 Nov. 22, 2018

Related U.S. Application Data

(60) Provisional application No. 62/509,444, filed on May 22, 2017.

(51) Int. Cl.
*H04B 7/185* (2006.01)
*H04J 3/08* (2006.01)

(52) U.S. Cl.
CPC ..... *H04B 7/18582* (2013.01); *H04B 7/18504* (2013.01); *H04B 7/18513* (2013.01); *H04B 7/18515* (2013.01); *H04J 3/08* (2013.01)

(58) Field of Classification Search
CPC ............ H04B 7/18582; H04B 7/18504; H04B 7/18513; H04B 7/18515; H04J 3/08
(Continued)

(56) References Cited

U.S. PATENT DOCUMENTS 6,240,072 B1 * 5/2001 Lo .................. H04B 7/2041
370/316
2007/0082609 A1 * 4/2007 Kiesling .............. H04B 7/2041
455/12.1
(Continued)

OTHER PUBLICATIONS

Angeletti, et al., "On-Ground Digital Beamforming Techniques for Satellite Smart Antennas", Proc. 19th AIAA, Toulouse, France, Apr. 2001, https://www.researchgate.net/publication/228965638_On-ground_digital_beamforming_techniques_for_satellite_smart_antennas, Apr. 2011.
(Continued)

*Primary Examiner* — Obaidul Huq
(74) *Attorney, Agent, or Firm* — Potomac Technology Law, LLC

(57) ABSTRACT

Approaches for ground-based beamforming for a very high throughput wireless communications system employing an airborne platform that generates a beam pattern via a multi-element antenna are provided. A beamformer includes a number of beamforming processors based on a frequency reuse scheme of the communications system. Each beamforming processor processes only the beam signals that are associated with a respective one of the frequencies of the reuse scheme, and thereby generates a component element signal for each of the elements of the array antenna that is associated with the respective frequency of that processor. Each beamforming processor applies a matrix of complex weights that is configured such that a composition of the component element signals for each antenna element facilitates the transmission of the element signals by the airborne platform to produce the beam pattern.

23 Claims, 9 Drawing Sheets

(58) Field of Classification Search
USPC .................................... 370/310, 315, 316
See application file for complete search history.

(56) References Cited

U.S. PATENT DOCUMENTS

| | | |
|---|---|---|
| 2007/0281612 A1* | 12/2007 | Benjamin .......... H04B 7/18515 455/13.3 |
| 2010/0302971 A1 | 12/2010 | Walker et al. |
| 2012/0326925 A1 | 12/2012 | Chang |
| 2013/0070677 A1 | 3/2013 | Chang |
| 2015/0255883 A1 | 9/2015 | Buer |

OTHER PUBLICATIONS

USPTO, "International Search Report & Written Opinion", PCT/US2018/033982, Aug. 6, 2018.

\* cited by examiner

SYSTEM AND METHOD FOR GROUND BASED BEAM FORMING (GBBF) FOR VERY HIGH THROUGHPUT SATELLITE (VHTS) SYSTEMS

RELATED APPLICATIONS

This application claims the benefit of the earlier filing date under 35 U.S.C. § 119(e) from U.S. Provisional Application Ser. No. 62/509,444 (filed 2017-05-22), the entirety of which is incorporated by reference herein.

BACKGROUND

Broadband technologies are taking a predominant role in the emerging information society, and, in particular, broadband satellite communication systems are being broadly employed to respond to the growing requirements of the information society. More specifically, based on global access and broadcasting capabilities, satellite communication systems are well suited to provide broadband services to remote locations and highly mobile users (e.g., broadband services provided to rural areas and to ships, aircraft, trains, etc.), as well as to major metropolitan areas of high population density and high broadband demands. Accordingly, the overall demand for broadband capacity continues to increase exponentially. Bandwidth availability limitations of satellite systems, however, continues to be a predominant issue in the continued growth of this communications technology.

In order to satisfy the growth in demand for high availability broadband capacity, broadband satellite communications systems that deploy high throughput satellites are becoming more prevalent. High throughput satellite (HTS) is a classification for a communications satellite that provides upwards of more than 20 times the total throughput of a classic FSS geostationary communications satellite (e.g., throughputs of more than 100 Gbit/sec of capacity are currently being deployed, which amounts to more than 100 times the capacity of a conventional Ku-band satellite). Moreover, these satellites typically utilize the same amount of allocated orbital spectrum, and thus significantly reducing cost-per-bit. The significant increase in capacity of an HTS system is achieved by employing wideband satellite technology, including an increased number of beams of a given satellite to increase the available bandwidth and thereby increase the respective capacity of the satellite.

Multi-beam communications satellites (e.g., spotbeam satellites) are generally designed such that a given geographic coverage area is serviced by a pattern of beams generated by a phased array antenna, where the individual beams and associated beam pattern are formed via a beamforming network deployed either onboard the satellite or deployed at a ground-based network control center. Further, with such multi-beam satellites, in order to avoid or minimize inter-beam interference, certain frequency reuse principles must be applied to the beam patterns of the antenna design. One of the primary guidelines for the beam pattern or frequency reuse pattern is that a frequency and polarization combination of one beam cannot be "reused" within a certain distance from another beam of the same frequency and polarization combination. The distance between beams is generally specified as the distance between beam centers of two beams of a same color (two beams of the same frequency band and polarization), where the distance is quantified in terms of the radius r of the beams. If the minimum distance requirements are not followed with regard to two such beams, then the beams will cause unacceptable levels of interference between them. For example, a reuse of four means that a set of four adjacent beams will have disjoint frequency and polarization assignments such that none of the beams of each set interfere with each other. In other words, adjacent sets of four beams separate the beams sharing a common frequency and polarization such that (even though they are reusing the same frequency and polarization assignments) the beams of one set will not excessively interfere with the respective beams of an adjacent set. With high-throughput multibeam satellites, a high level frequency reuse and spotbeam technology is employed to enable frequency reuse across multiple narrowly focused spotbeams (usually in the order of 100's of kilometers). Further, in order to provide an adaptive distribution of capacity the coverage area of the satellite (e.g., to address a non-uniform distribution of users and capacity demand over the coverage area), satellite architectures may employ adaptively or dynamically steerable beams.

A phased array antenna generally comprises multiple radiating elements arranged in an array format that are electrically scanned to generate desired beam pattern of radio waves that can be electronically steered to point in different directions without physically moving the antenna or antenna elements. The individual beams are formed through the shifting of the phase and amplitude of the signal emitted from each radiating element, which serves as constructive interference toward the desired direction for the waves and as destructive interference for undesired directions. The main beam in a phased array antenna points in the direction of the increased phase shift. Adding a phase shift to the signal received or transmitted by each antenna in the array results in the collective signal of the individual antenna elements to act as the signal of a single antenna with performance vastly different from the individual antennas in the array. In an array antenna, the radio frequency current from the transmitter is fed to the individual antennas with the correct phase relationship so that the radio waves from the separate antennas add together to increase the radiation in a desired direction, while cancelling to suppress radiation in undesired directions. In a phased array, the power from the transmitter is fed to the antennas through individual amplifiers and phase shifters that electronically alter the amplitude and phase of the output of each antenna element thereby steering the beam(s) of the antenna. In other words, both the amplitude and phase of each antenna element are controlled, where a combined amplitude and phase control are used to adjust side lobe levels and steer the resulting beams. A combined relative amplitude $a_k$ and phase shift $\phi_k$ for each antenna element k is applied via a respective complex weight $w_k$ applied to the signal for the respective antenna element. In a multibeam system, a matrix of complex weights is applied to the antenna feed or element signals to generate the desired beams.

As provided above, the beamforming may be employed as a space-based approach where the beamforming network is implemented in the satellite payload, or as a ground-based approach where the beamforming network consists of a ground-based implementation, for example deployed at one or more gateway locations. In the case of a ground-based beamforming approach, for the forward link (the link from the gateway to the user terminals (UTs), the gateway generates the individual signals for the downlink of each feed element of the satellite antenna.

FIG. 1A illustrates a traditional beamforming architecture for the forward-link in a multibeam wireless communications system. For a multi-beam forward link transmission, at the gateway, the transmission signal for each respective satellite downlink beam is fed into a beamformer, which applies the amplitude and phase weighting via a number of complex multiplications based on an array of complex weights to generate the feed signals for respective transmission by the elements of the satellite antenna array. For example (as shown in FIG. 1A), for M beams and N antenna elements, complex multiplications are applied to the M beam signals ($S_1$, $S_2$, $S_3$, ..., $S_M$) based on an N×M beamforming matrix of complex weights to generate the N element signals ($e_1$, $e_2$, ..., $e_N$). The N element signals are then transmitted to the satellite. The satellite processes and provides each of the received element signals to the respective antenna element, and the antenna transmits the resulting M beams in a beam pattern based on the complex amplitude and phase weights applied by the gateway beamforming network.

FIG. 1B illustrates a traditional beamforming architecture for the return-link in a multibeam wireless communications system. In the return direction, the UTs transmit uplink signals to the satellite, which are received by the satellite in the respective beams within which each of the UTs is located. The satellite in turn transmits each of the feed or element signals (as received by the respective elements of the satellite antenna) to the gateway. At the gateway, the received element signals are fed into a beamformer, which similarly applies amplitude and phase weighting via a number of complex multiplications based on an array of complex weights to regenerate the individual beams as received by the satellite. For example, for the M beam and N antenna element example, complex multiplications are applied to the N element signals ($e_1$, $e_2$, ..., $e_N$) based on an M×N matrix of complex weights to generate the M beam signals ($S_1$, $S_2$, $S_3$, ..., $S_M$). The resulting M beam signals ($S_1$, $S_2$, $S_3$, ..., $S_M$) are then processed by the gateway to decode the original transmissions of the respective UTs.

In high-throughput satellite systems, however, as bandwidth, adaptability and flexibility requirements increase, the increased bandwidth and increased number of narrow beams results in a higher required rate of complex multiplications by the beamforming network, which introduces added complexity and design challenges.

What is needed, therefore, is an approach for adaptive beamforming for a multibeam wireless communications system that simplifies the required beamforming computations and associated complexity of the beamforming network without sacrificing the number of achievable beams and the system throughput.

SOME EXAMPLE EMBODIMENTS

The present invention advantageously addresses the foregoing requirements and needs, as well as others, by providing approaches for adaptive beamforming for a multibeam wireless communications system that simplifies the required beamforming computations and associated complexity of the beamforming network without sacrificing the number of achievable beams and the system throughput.

In accordance with example embodiments of the present invention, a beamforming system of a gateway terminal in a wireless communications system is provided. The beamforming system comprises x beamforming processors, and N frequency multiplexers. Each beamforming processor is configured to receive M/4 beam signals, where each beam signal is configured to carry data for transmission, by an airborne communications platform of the wireless communications system, via a respective spotbeam of a multi-element array antenna of the airborne communications platform, where the multi-element array antenna employs M such spotbeams in a spotbeam pattern with a frequency reuse of x beam-types, and the multi-element array antenna comprises N elements, and where the M/4 beam signals that each beamforming processor is configured to receive is each configured for transmission via a same respective beam-type. Each frequency multiplexer is configured to generate an element signal for transmission by a respective element of the multi-element array antenna. Each beamforming processor is further configured to generate N component element signals by applying an array of weight factors to the respective M/4 beam signals received by it, where the array of weight factors is configured such that each of the N component element signals generated by the beamforming processor forms a component of a respective one of the element signals generated by a respective one of the frequency multiplexers, and to provide each of the N component element signals to the respective one of the frequency multiplexers. The generation of the element signal by each frequency multiplexer is based on the respective component element signals provided to it by the x beamforming processors. Each array of weight factors applied by a respective beamforming processor is also configured such that the transmission of all of the element signals by the respective elements of the multi-element array antenna will generate the spotbeam pattern.

In accordance with example embodiments of the present invention, a method for beamforming by a gateway terminal in a wireless communications system is provided. Each of x beamforming processors of the gateway terminal receives M/4 beam signals, where each beam signal is configured to carry data for transmission, by an airborne communications platform of the wireless communications system, via a respective spotbeam of a multi-element array antenna of the airborne communications platform, where the multi-element array antenna employs M such spotbeams in a spotbeam pattern with a frequency reuse of x beam-types, and the multi-element array antenna comprises N elements, and where the M/4 beam signals that each beamforming processor receives is each configured for transmission via a same respective beam-type. Each of N frequency multiplexers generates an element signal for transmission by a respective element of the multi-element array antenna. Each of the x beamforming processors of the gateway terminal generates N component element signals by applying an array of weight factors to the respective M/4 beam signals received by it, where the array of weight factors is configured such that each of the N component element signals generated by the beamforming processor forms a component of a respective one of the element signals generated by a respective one of the frequency multiplexers, and each of the N component element signals is provided to the respective one of the frequency multiplexers. The generation of the element signal by each frequency multiplexer is based on the respective component element signals provided to it by the x beamforming processors. Each array of weight factors applied by a respective beamforming processor is also configured such that the transmission of all of the element signals by the respective elements of the multi-element array antenna will generate the spotbeam pattern.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Figure 1B:
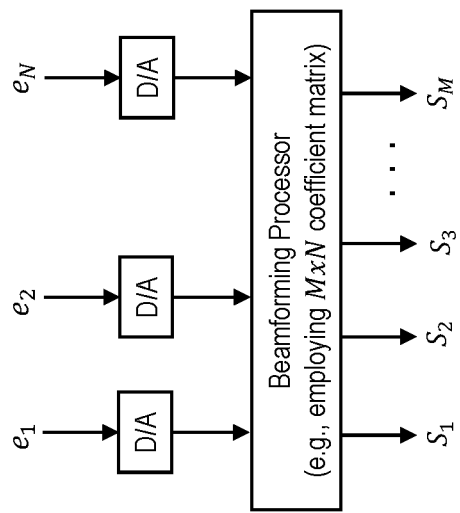
FIG. 1B illustrates a traditional beamforming architecture for the return-link in a multibeam wireless communications system.

Approaches for adaptive beamforming for a multibeam wireless communications system that simplifies the required beamforming computations and associated complexity of the beamforming network without sacrificing the number of achievable beams and the system throughput, are provided. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the components, methods, processes and approaches described herein may be processor-implemented using processing circuitry that may comprise one or more microprocessors, digital signal processors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Figure 1A:
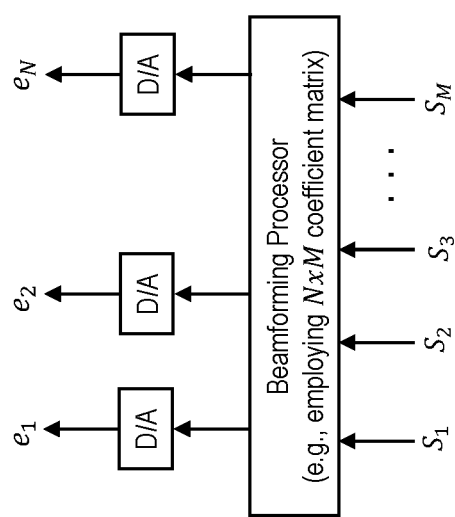
FIG. 1A illustrates a traditional beamforming architecture for the forward-link in a multibeam wireless communications system.

As provided above, FIG. 1A illustrates a traditional beamforming architecture for the forward-link in a multibeam wireless communications system. For a multi-beam forward link transmission, at the gateway, the transmission signal for each respective satellite downlink beam is fed into a beamformer, which applies the amplitude and phase weighting via a number of complex multiplications based on an array of complex weights or coefficients to generate the feed signals for respective transmission by the elements of the satellite antenna array. For example (as shown in FIG. 1A), for M beams and N antenna elements, complex multiplications are applied to the M beam signals ($S_1, S_2, S_3, \ldots, S_M$) based on an N×M beamforming matrix of complex weights to generate the N element signals ($e_1, e_2, \ldots, e_N$)—the N×M matrix of complex weights is applied to the M×1 matrix or vector of beam signals to generate the N×1 matrix or vector of antenna element signals. The N element signals are then transmitted to the satellite. The satellite processes and provides each of the received element signals to the respective antenna element, and the antenna transmits the resulting M beams in a beam pattern based on the complex amplitude and phase weights applied by the gateway beamforming network.

The matrix operation for the forward link, in the M beam and N antenna element example, can be expressed as follows:

$$\begin{bmatrix} e_1 \\ e_2 \\ \vdots \\ e_N \end{bmatrix} = \begin{bmatrix} a_{1,1} & \cdots & a_{1,M} \\ \vdots & \ddots & \vdots \\ a_{N,1} & \cdots & a_{N,M} \end{bmatrix} \begin{bmatrix} s_1 \\ s_2 \\ s_3 \\ \vdots \\ s_M \end{bmatrix} \quad (1a)$$

Or $$E = A * S \quad (1b)$$

As also provided above, FIG. 1B illustrates a traditional beamforming architecture for the return-link in a multibeam wireless communications system. In the return direction, the UTs transmit uplink signals to the satellite, which are received by the satellite in the respective beams within which each of the UTs is located. The satellite in turn transmits each of the feed or element signals (as received by the respective elements of the satellite antenna) to the gateway. At the gateway, the received element signals are fed into a beamformer, which similarly applies amplitude and phase weighting via a number of complex multiplications based on an array of complex weights or coefficients to regenerate the individual beams as received by the satellite. For example, for the M beam and N antenna element example, complex multiplications are applied to the N element signals ($e_1, e_2, \ldots, e_N$) based on an M×N matrix of complex weights to generate the M beam signals ($s_1, s_2, s_3, \ldots, s_M$)—the M×N matrix of complex weights is applied to the N×1 matrix or vector of element signals to generate the M×1 matrix of beam signals. The resulting M beam signals ($S_1, S_2, S_3, \ldots, s_M$) are then processed by the gateway to decode the original transmissions of the respective UTs. The further processing of the beam signals by the gateway is not shown in the Figure of further discussed herein as such processing is well known in the field of satellite communications and is not essential to the improved beam forming concepts of the present invention.

The matrix operation for the return link, in the M beam and N antenna element example, can be expressed as follows:

$$\begin{bmatrix} s_1 \\ s_2 \\ s_3 \\ \vdots \\ s_M \end{bmatrix} = \begin{bmatrix} b_{1,1} & \cdots & b_{1,N} \\ \vdots & \ddots & \vdots \\ b_{M,1} & \cdots & b_{M,N} \end{bmatrix} \begin{bmatrix} e_1 \\ e_2 \\ \vdots \\ e_N \end{bmatrix} \quad (2a)$$

Or $$S = B * E \quad (2b)$$

Further, as would be generally appreciated, for any given beam pattern, at a given point or period of time, the beamforming network calculates the appropriate coefficients for the respective beamforming matrices of the forward and return links. Then, for a satellite-based beamforming implementation, the gateway would upload the required beamforming matrices to the satellite, and the beamforming network of the satellite payload would perform the beamforming operations based on the provided matrices. Accordingly, for an adaptive or dynamic beamforming system, the gateway would determine the respective matrices and upload them to the satellite at an appropriate frequency (e.g., depending on the rate of change of the beam pattern). Alternatively, for a ground-based beamforming approach, the gateway would perform the beamforming operations and send the resulting element signals to the satellite for each respective point in time (as described above).

Based on the above formulation of the matrix operation for the forward link (1), each elemental signal $e_k$ includes a contribution from all of the beam signals. Further, for a given total spectrum or bandwidth of the beam signals, each of the elemental signals carries that total bandwidth. For example, given a total spectrum or bandwidth of 2 GHz, each of the elemental signals $e_k$ will essentially be a 2 GHz signal. Further, given a total bandwidth of Y Hz, and based on a sampling rate of more than two times the Nyquist rate to avoid aliasing in the signals, a typical complex sampling rate, for example, could be 1.5*Y complex samples per second—whereby, as a complex sampling, a 1.5× rate of both the I and Q signal components is equivalent to a 3× actual sampling rate. The beam signals ($s_1, s_2, s_3, \ldots, s_M$) are thus sampled at 1.5*Y samples per second (complex) for the matrix operation. Accordingly, given that there are N×M elements in the weighting matrix, the matrix operation requires a total of 1.5*Y*N*M complex signal multiplications per second. As is evident, therefore, in a high throughput narrow beam system, the number of complex multiplications per second can increase to an immense number, which in turn significantly increases the complexity of the beamforming network. For example, in a 2 GHz Ka band system, with a 4-color reuse pattern of 500 MHz per beam, and with a satellite antenna that can generate 100 narrow beams (as the desired beam-width narrows the required antenna size increases), the required number of matrix multiplications per second of 1.5*500 MHz*N*100 can amount to an significantly high processing rate.

Figure 2A:
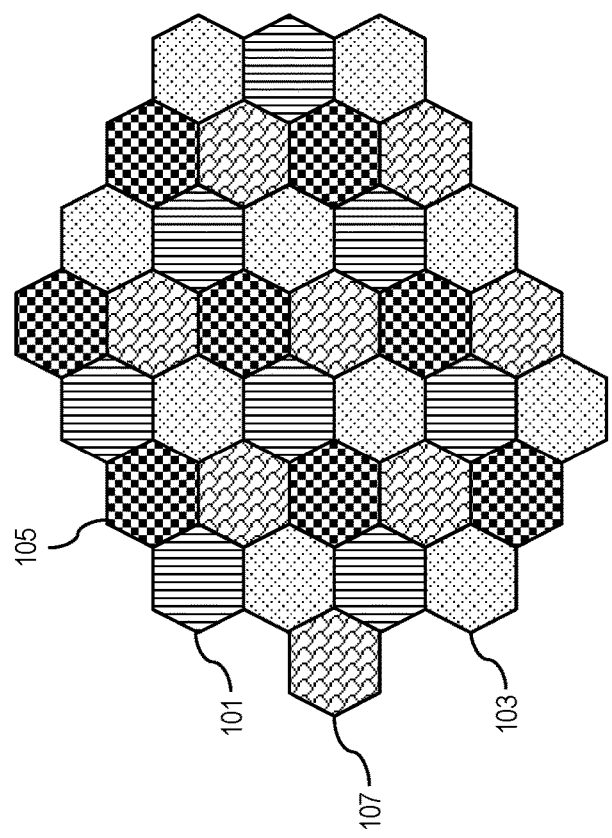
FIG. 2A illustrates a typical four-beam reuse pattern.
Figure 2B:
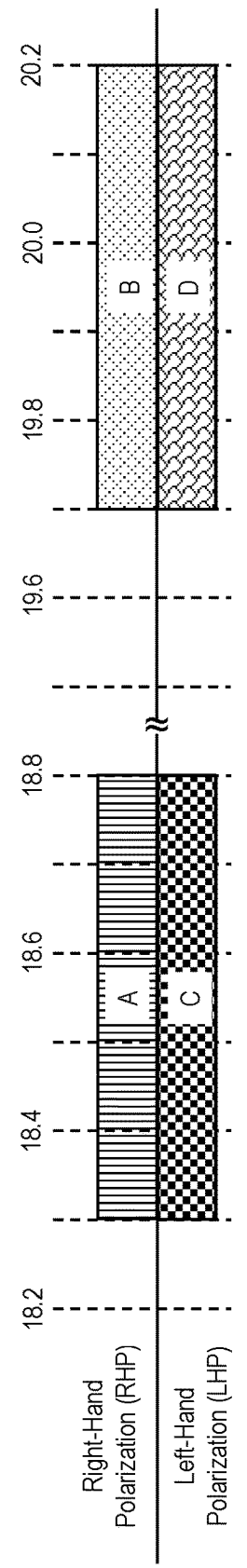
FIG. 2B illustrates typical frequency band and polarization assignments for the beams of FIG. 2A, using a total Ka spectrum of 2 GHz.

In order to reduce the required complexity of the beamforming network, embodiments of the present invention provide approaches that facilitate a reduction in the required processing rate relative to the factor of the frequency reuse scheme employed by the system at any given point in time. For example, with a four-beam reuse scheme, such embodiments of the present invention can reduce the computational complexity of the beamforming network by a factor of four. FIG. 2A illustrates a typical four-beam reuse pattern of a satellite, where, for example, each cell with the striped pattern of the cell 101 on the ground reflects a right-hand polarization of a first frequency or frequency band, each cell with the dot pattern of the cell 103 reflects a left-hand polarization of the same frequency band as that of 101, each cell with the checkered pattern of the cell 105 reflects a right-hand polarization of a second frequency or frequency band, and each cell with the brick pattern of the cell 107 reflects a left-hand polarization of the same frequency band as that of the cell 105. In such a four-color reuse pattern, for example, the distance between the beam centers of two beams of the same color are $2\sqrt{3}*r$ apart, where r is the center-to-vertex radius of the hexagonal beam. Further, FIG. 2B illustrates typical frequency band and polarization assignments for the beams of FIG. 2A, using a total Ka spectrum of Y=2 GHz. By way of example, each beam A may comprise the RHP for the Ka downlink frequency band 18.3-18.8 GHz (e.g., 500 MHz per beam), each beam B may comprise the RHP for the Ka downlink frequency band 19.7-20.2 GHz (500 MHz per beam), each beam C may comprise the LHP for the Ka downlink frequency band 18.3-18.8 GHz (500 MHz per beam), and each beam D may comprise the LHP for the Ka downlink frequency band 19.7-20.2 GHz (500 MHz per beam). Alternatively, as would be appreciated, the different beams of the reuse pattern may comprise four beams of distinct frequency bands or center frequencies.

As is shown, with the foregoing four-beam reuse scheme of FIGS. 2A and 2B, each beam carries a bandwidth of $Y/4=500$ MHz. Further, as is apparent from this four-beam reuse scheme, each of only four different beam frequency/polarization pairs is reused throughout the beam pattern of the antenna. For example, for a satellite employing 100 beams, each of 4 sets of 25 beams will be using a common frequency/polarization pair. For purposes hereof, the four different frequency/polarization pairs will be denoted as $f_1$, $f_2$, $f_3$, $f_4$. Accordingly, with the example of M beams, $M/4$ of the beams will be using $f_1$, $M/4$ of the beams will be using $f_2$, $M/4$ of the beams will be using $f_3$, and $M/4$ of the beams will be using $f_4$.

With this context in mind, according to one example embodiment, for the forward link, the weighting matrix of the beamformer can be determined based on an S vector arranged with the beam signals for each beam type ($f_1$, $f_2$, $f_3$, $f_4$) grouped together, which can be expressed as follows (where $s_1(f_1), s_2(f_1), \ldots, s_{M/4}(f_1)$ reflect the beam signals for the $M/4$ beam signals for the $f_1$ beams, $s_1(f_2), s_2(f_2), \ldots, s_{M/4}(f_2)$ reflect the beam signals for the $M/4$ beam signals for the $f_2$ beams, $s_1(f_3), s_2(f_3), \ldots, s_{M/4}(f_3)$ reflect the beam signals for the $M/4$ beam signals for the $f_3$ beams, and $s_1(f_4), s_2(f_4), \ldots, s_{M/4}(f_4)$ reflect the beam signals for the $M/4$ beam signals for the $f_4$ beams):

$$\begin{bmatrix} e_1 \\ e_2 \\ \vdots \\ e_N \end{bmatrix} = \begin{bmatrix} a_{1,1} & \cdots & a_{1,M} \\ \vdots & \ddots & \vdots \\ a_{N,1} & \cdots & a_{N,M} \end{bmatrix} \begin{bmatrix} s_1(f_1) \\ s_2(f_1) \\ \vdots \\ s_{M/4}(f_1) \\ s_1(f_2) \\ s_1(f_2) \\ \vdots \\ s_{M/4}(f_2) \\ s_1(f_3) \\ s_1(f_3) \\ \vdots \\ s_{M/4}(f_3) \\ s_1(f_4) \\ s_1(f_4) \\ \vdots \\ s_{M/4}(f_4) \end{bmatrix} \quad (3a)$$

Further, as is evident from the expression (3a), pursuant to the multiplication of the A and S matrices, a submatrix consisting of the first $M/4$ columns of the A matrix is multiplied with the $S(f_1)$ vector $(s_1(f_1), s_2(f_1), \ldots, s_{M/4}(f_1))$, a submatrix consisting of the second $M/4$ columns of the A matrix is multiplied with the $S(f_2)$ vector $(s_1(f_2), s_2(f_2), \ldots, s_{M/4}(f_2))$, a submatrix consisting of the third $M/4$ columns of the A matrix is multiplied with the $S(f_3)$ vector $(s_1(f_3), s_2(f_3), \ldots, s_{M/4}(f_3))$, and a submatrix consisting of the fourth $M/4$ columns of the A matrix is multiplied with the $S(f_4)$ vector $(s_1(f_4), s_2(f_4), \ldots, s_{M/4}(f_4))$—as follows:

$$\begin{bmatrix} e_1 \\ e_2 \\ \vdots \\ e_N \end{bmatrix} = \begin{bmatrix} a_{1,1} & \cdots & a_{1,M/4} & \cdots & a_{1,2M/4} & \cdots & a_{1,3M/4} & \cdots & a_{1,M} \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ a_{N,1} & \cdots & a_{N,M/4} & \cdots & a_{N,2M/4} & \cdots & a_{N,3M/4} & \cdots & a_{N,M} \end{bmatrix} \quad (4a)$$

$$\begin{bmatrix} s_1(f_1) \\ s_2(f_1) \\ \vdots \\ s_{M/4}(f_1) \\ s_1(f_2) \\ s_1(f_2) \\ \vdots \\ s_{M/4}(f_2) \\ s_1(f_3) \\ s_1(f_3) \\ \vdots \\ s_{M/4}(f_3) \\ s_1(f_4) \\ s_1(f_4) \\ \vdots \\ s_{M/4}(f_4) \end{bmatrix} = \begin{bmatrix} a_{1,1} & \cdots & a_{1,\frac{M}{4}} \\ \vdots & \ddots & \vdots \\ a_{N,1} & \cdots & a_{N,(\frac{M}{4})} \end{bmatrix}$$

$$\begin{bmatrix} s_1(f_1) \\ s_2(f_1) \\ \vdots \\ s_{M/4}(f_1) \end{bmatrix} + \begin{bmatrix} a_{1,(\frac{M}{4}+1)} & \cdots & a_{1,\frac{2M}{4}} \\ \vdots & \ddots & \vdots \\ a_{N,(\frac{M}{4}+1)} & \cdots & a_{N,\frac{2M}{4}} \end{bmatrix}$$

$$\begin{bmatrix} s_1(f_2) \\ s_2(f_2) \\ \vdots \\ s_{M/4}(f_2) \end{bmatrix} + \begin{bmatrix} a_{1,(\frac{2M}{4}+1)} & \cdots & a_{1,\frac{3M}{4}} \\ \vdots & \ddots & \vdots \\ a_{N,(\frac{2M}{4}+1)} & \cdots & a_{N,\frac{3M}{4}} \end{bmatrix}$$

$$\begin{bmatrix} s_1(f_3) \\ s_2(f_3) \\ \vdots \\ s_{M/4}(f_3) \end{bmatrix} + \begin{bmatrix} a_{1,(\frac{3M}{4}+1)} & \cdots & a_{1,M} \\ \vdots & \ddots & \vdots \\ a_{N,(\frac{3M}{4}+1)} & \cdots & a_{N,M} \end{bmatrix}$$

$$\begin{bmatrix} s_1(f_4) \\ s_2(f_4) \\ \vdots \\ s_{M/4}(f_4) \end{bmatrix} = \begin{bmatrix} e_1(f_1) \\ e_2(f_1) \\ \vdots \\ e_N(f_1) \end{bmatrix} +$$

$$+ \begin{bmatrix} e_1(f_2) \\ e_2(f_2) \\ \vdots \\ e_N(f_2) \end{bmatrix} + \begin{bmatrix} e_1(f_3) \\ e_2(f_3) \\ \vdots \\ e_N(f_3) \end{bmatrix} + \begin{bmatrix} e_1(f_4) \\ e_2(f_4) \\ \vdots \\ e_N(f_4) \end{bmatrix} =$$

$$\begin{bmatrix} e_1(f_1) + e_1(f_2) + e_1(f_3) + e_1(f_4) \\ e_2(f_1) + e_2(f_2) + e_2(f_3) + e_2(f_4) \\ \vdots \\ e_N(f_1) + e_N(f_2) + e_N(f_3) + e_N(f_4) \end{bmatrix}$$

As such, considering the expression (4a), the expression (1b) can be rewritten as follows (where the matrices $A_1$, $A_2$, $A_3$, $A_4$ reflect the four respective N×M/4 submatrices of the A matrix, the vectors $S(f_1), S(f_2), S(f_3), S(f_4)$ are the subvectors of the beam signals for each of the four respective beam types ($f_1$, $f_2$, $f_3$, $f_4$), and E is the vector of element signals $e_1$, $e_2$, ..., $e_N$):

$$E = A_1 S(f_1) + A_2 S(f_2) + A_3 S(f_3) + A_4 S(f_4) \quad (5a)$$

According to a further example embodiment, for the return link, the weighting matrix of the beamformer is determined using a vector E based on component signals derived from the channelization and downconversion of the element signals ($e_1, e_2, \ldots, e_N$) as received by the satellite. The elements of the vector E will thereby consist of the channelized and downconverted component signals of each element signal based on the respective beam type ($f_1$, $f_2$, $f_3$, $f_4$) via which the component signals were received by the satellite. In other words, each element signal $e_i$ received by the satellite will consist of a composition of respective component signals received via each beam within the field of view of the uplink of the respective satellite antenna. For example, assuming 16 uplink beams and a reuse factor of four, the satellite antenna will simultaneously receive 16 uplink beam signals (where each uplink beam signal will include the transmissions of multiple UTs located within the respective beam), and there will be four beam signals of each beam type ($f_1$, $f_2$, $f_3$, $f_4$). Accordingly, the signal received by each element of the satellite antenna will comprise a component from each of the 16 uplink beam signals, and each component signal will be associated with or received via a respective beam type, and thus each element will receive a number of component signals (e.g., four in the case of the reuse factor of four) associated with each beam type ($f_1$, $f_2$, $f_3$, $f_4$). For purposes hereof, the component element signals will be denoted as $e_x(f_y)$, where $e_x$ reflects the element number ($e_1, e_2, \ldots, e_N$) and $f_y$ reflects the beam type ($f_1$, $f_2$, $f_3$, $f_4$)—in other words $e_x(f_1)$, (x=1, 2, ..., N) are the respective component signals of each of the antenna elements ($e_1, e_2, \ldots, e_N$) associated with the beam type $f_1$, $e_x(f_2)$, (x=1, 2, ..., N) are the respective component signals of each of the antenna elements ($e_1, e_2, \ldots, e_N$) associated with the beam type $f_2$, etc.

Further, for this return link embodiment, similar to the forgoing forward link embodiment, the weighting matrix of the beamformer can be determined based on an E vector arranged with the element component signals for each beam type ($f_1$, $f_2$, $f_3$, $f_4$) grouped together, which can be expressed as follows (where the component signals ($e_1(f_1)$, $e_2(f_1), \ldots, e_N(f_1)$) reflect the component signals associated the $f_1$ beams, the component signals ($e_1(f_2), e_2(f_2), \ldots, e_N(f_2)$) reflect the component signals associated with the $f_2$ beams, the component signals ($e_1(f_3), e_2(f_3), \ldots, e_N(f_3)$) reflect the component signals associated with the $f_3$ beams, and the component signals ($e_1(f_4), e_2(f_4), \ldots, e_N(f_4)$) reflect the component signals associated with the $f_4$ beams):

$$\begin{bmatrix} s_1 \\ s_2 \\ \vdots \\ s_M \end{bmatrix} = \begin{bmatrix} b_{1,1} & \cdots & b_{1,N} \\ \vdots & \ddots & \vdots \\ b_{M,1} & \cdots & b_{M,N} \end{bmatrix} \begin{bmatrix} e_1(f_1) \\ e_2(f_1) \\ \vdots \\ e_N(f_1) \\ e_1(f_2) \\ e_2(f_2) \\ \vdots \\ e_N(f_2) \\ e_1(f_3) \\ e_2(f_3) \\ \vdots \\ e_N(f_3) \\ e_1(f_4) \\ e_2(f_4) \\ \vdots \\ e_N(f_4) \end{bmatrix} \quad (3b)$$

Further, as is evident from the expression (3b), pursuant to the multiplication of the B and E matrices, a submatrix consisting of the first M/4 rows of the B matrix is multiplied with the $E(f_1)$ vector ($e_1(f_1), e_2(f_1), \ldots, e_{M/4}(f_1)$), a submatrix consisting of the second M/4 rows of the B matrix is multiplied with the $E(f_2)$ vector ($e_1(f_2), e_2(f_2), \ldots, e_{M/4}(f_2)$), a submatrix consisting of the third M/4 rows of the B matrix is multiplied with the $E(f_3)$ vector ($e_1(f_3), e_2(f_3), \ldots, e_{M/4}(f_3)$), and a submatrix consisting of the fourth M/4 rows of the B matrix is multiplied with the $E(f_4)$ vector ($e_1(f_4), e_2(f_4), \ldots, e_{M/4}(f_4)$)—as follows:

$$\begin{bmatrix} s_1 \\ s_2 \\ \vdots \\ s_M \end{bmatrix} = \begin{bmatrix} b_{1,1} & b_{1,2} & \cdots & b_{1,N} \\ \cdots & \cdots & \cdots & \cdots \\ b_{M/4,1} & b_{M/4,2} & \cdots & b_{M/4,N} \\ \cdots & \cdots & \cdots & \cdots \\ b_{2M/4,1} & b_{2M/4,2} & \cdots & b_{2M/4,N} \\ \cdots & \cdots & \cdots & \cdots \\ b_{3M/4,1} & b_{3M/4,2} & \cdots & b_{3M/4,N} \\ \cdots & \cdots & \cdots & \cdots \\ b_{M,1} & b_{M,2} & \cdots & b_{M,N} \end{bmatrix} \begin{bmatrix} e_1(f_1) \\ e_2(f_1) \\ \vdots \\ e_N(f_1) \\ e_1(f_2) \\ e_2(f_2) \\ \vdots \\ e_N(f_2) \\ e_1(f_3) \\ e_2(f_3) \\ \vdots \\ e_N(f_3) \\ e_1(f_4) \\ e_2(f_4) \\ \vdots \\ e_N(f_4) \end{bmatrix} = \quad (4b)$$

$$\begin{bmatrix} b_{1,1} & b_{1,2} & \cdots & b_{1,N} \\ \cdots & \cdots & \cdots & \cdots \\ b_{\frac{M}{4},1} & b_{\frac{M}{4},2} & \cdots & b_{\frac{M}{4},N} \end{bmatrix} \begin{bmatrix} e_1(f_1) \\ e_2(f_2) \\ \vdots \\ e_N(f_1) \end{bmatrix} +$$

$$\begin{bmatrix} b_{(\frac{M}{4}+1),1} & b_{(\frac{M}{4}+1),2} & \cdots & b_{(\frac{M}{4}+1),N} \\ \cdots & \cdots & \cdots & \cdots \\ b_{\frac{2M}{4},1} & b_{\frac{2M}{4},2} & \cdots & b_{\frac{2M}{4},N} \end{bmatrix} \begin{bmatrix} e_1(f_2) \\ e_2(f_2) \\ \vdots \\ e_N(f_2) \end{bmatrix} +$$

-continued $$\begin{bmatrix} b_{(\frac{2M}{4}+1),1} & b_{(\frac{2M}{4}+1),2} & \cdots & b_{(\frac{2M}{4}+1),N} \\ \cdots & \cdots & \cdots & \cdots \\ b_{\frac{3M}{4},1} & b_{\frac{3M}{4},2} & \cdots & b_{\frac{3M}{4},N} \end{bmatrix} \begin{bmatrix} e_1(f_3) \\ e_2(f_3) \\ \vdots \\ e_N(f_3) \end{bmatrix} +$$

$$\begin{bmatrix} b_{(\frac{3M}{4}+1),1} & b_{(\frac{3M}{4}+1),2} & \cdots & b_{(\frac{3M}{4}+1),N} \\ \cdots & \cdots & \cdots & \cdots \\ b_{M,1} & b_{M,2} & \cdots & b_{M,N} \end{bmatrix} \begin{bmatrix} e_1(f_4) \\ e_2(f_4) \\ \vdots \\ e_N(f_4) \end{bmatrix}$$

As such, considering the expression (4b), the individual $S(f_i)$ vectors can be expressed as follows (where each $S(f_i)$ is a vector of the M/4 beam signals for the $f_i$ beams, the matrices $B_1$, $B_2$, $B_3$, $B_4$ reflect the four respective M/4×N submatrices of the B matrix, and the vectors $E(f_1)$, $E(f_2)$, $E(f_3)$, $E(f_4)$ are the subvectors of the element component signals grouped based on the four respective beam types ($f_1$, $f_2$, $f_3$, $f_4$)):

$$S(f_1)=B_1E(f_1), S(f_2)=B_2E(f_2), S(f_3)=B_3E(f_3), S(f_4)=B_4E(f_4) \quad (5b)$$

As is evident from the expressions (4a) and (5a), above, each of the $A_i$ submatrices contains ¼ the number of elements or entries as the A matrix of expressions (1a) and (2a). Further, each of the beam signals $S_i$ reflects a bandwidth of Y/4 Hz, and thus the respective sampling rate may be 1.5*Y/4 samples per second. Therefore, instead of using a matrix of M×N elements, and a sampling rate of 1.5*Y, the present embodiment uses four submatrices of (M/4)×N elements each and a sampling rate of 1.5*(Y/4) samples per second. Accordingly, the foregoing example embodiment achieves a reduction in the required number of complex operations of the beamformer by a factor of four. More specifically, the required number of complex multiplications for the beamformer is 4*(M/4)*N*1.5*(Y/4)= (1.5*Y*N*M)/4. Similarly, the required number of complex multiplications for the return link beamformer is also (1.5*Y*N*M)/4.

Figure 3A:
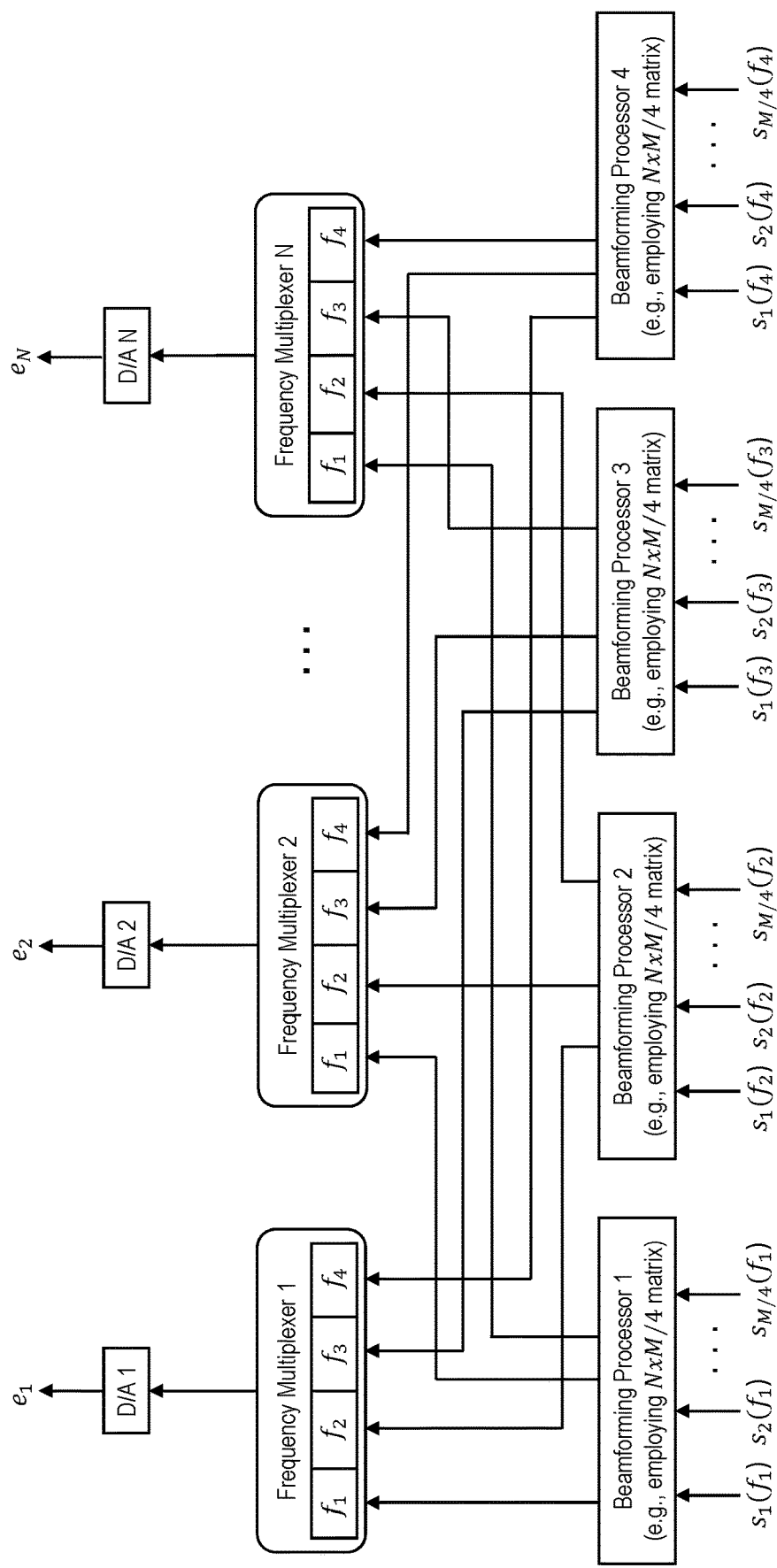
FIG. 3A illustrates a forward link beamforming network architecture assuming a four-beam reuse scheme, in accordance with example embodiments of the present invention.

FIG. 3A illustrates an example forward link beamforming network architecture, assuming a four-beam reuse scheme, in accordance with example embodiments of the present invention. The beamforming network architecture of FIG. 3A employs four separate beamforming processors that operate in the baseband, where each beamforming processor processes the beam signals for a respective beam type (e.g., frequency/polarization pair). The beamforming processor 1 processes the $f_1$ beam signals ($s_1(f_1)$, $s_2(f_1)$, . . . , $s_{M/4}(f_1)$), the beamforming processor 2 processes the $f_2$ beam signals ($s_1(f_2)$, $s_2(f_2)$, . . . , $s_{M/4}(f_2)$), the beamforming processor 3 processes the $f_3$ beam signals ($s_1(f_3)$, $s_2(f_3)$, . . . , $s_{M/4}(f_3)$), and the beamforming processor 4 processes the $f_4$ beam signals ($s_1(f_4)$, $s_2(f_4)$, . . . , $s_{M/4}(f_4)$). As shown from the above matrix operation (4a), each beamforming processor generates N baseband component element signals associated with the respective beam type ($f_1$, $f_2$, $f_3$, $f_4$). As also shown from the matrix operation (4a), each of the ultimate element signals ($e_1$, $e_2$, . . . , $e_N$) includes contribution from the component of the respective element signal associated with each of the beam types ($f_1$, $f_2$, $f_3$, $f_4$)—the element signal $e_1$ includes a component or contribution from each of the component element signals $e_1(f_1)$, $e_1(f_2)$, $e_1(f_3)$, $e_1(f_4)$, the element signal $e_2$ includes a component or contribution from each of the component element signals $e_1(f_1)$, $e_2(f_2)$, $e_2(f_3)$, $e_2(f_4)$, etc. Accordingly, as shown in FIG. 3A, each beamforming processor feeds the generated element signals to a respective upsampler and shifter or frequency multiplexer— the component element signals $e_1(f_1)$, $e_2(f_1)$, . . . , $e_N(f_1)$ are fed by the beamforming processor 1 to the frequency multiplexers 1, 2, . . . , N, respectively, the component element signals $e_1(f_2)$, $e_2(f_2)$, . . . , $e_N(f_2)$ are fed by the beamforming processor 2 to the frequency multiplexers 1, 2, . . . , N, respectively, the component element signals $e_1(f_3)$, $e_2(f_3)$, . . . , $e_N(f_3)$ are fed by the beamforming processor 3 to the frequency multiplexers 1, 2, . . . , N, respectively, and the component element signals $e_1(f_4)$, $e_2(f_4)$, . . . , $e_N(f_4)$ are fed by the beamforming processor 4 to the frequency multiplexers 1, 2, . . . , N, respectively.

As provided above, if the total bandwidth of the system is Y MHz, then the sampling rate for each beam signal $s_i$ is 1.5*(Y/4) complex samples per second. Each resulting element signal, however, provides the total bandwidth of Y MHz. Accordingly, each frequency multiplexer shifts or frequency translates the input element signals to provide the total Y MHz frequency band or spectrum (as reflected by the overall frequency band composed of the subbands 1, 2, 3, 4 of each frequency multiplexer depicted in FIG. 3A). Further, because the sampling rate for each of the element signals (which each provides the full spectrum) is 1.5*Y complex samples per second (or four times the sampling rate for the beam signals associated with each beam type), each frequency multiplexer also upsamples the input component element signals to the required sampling rate. Each frequency multiplexer then feeds the resulting frequency multiplexed element signal to a respective digital-to-analog converter (D/A), which converts the digital element signal into the ultimate analog element signal that will be uploaded to the satellite and transmitted by the respective element of the satellite antenna.

Figure 3B:
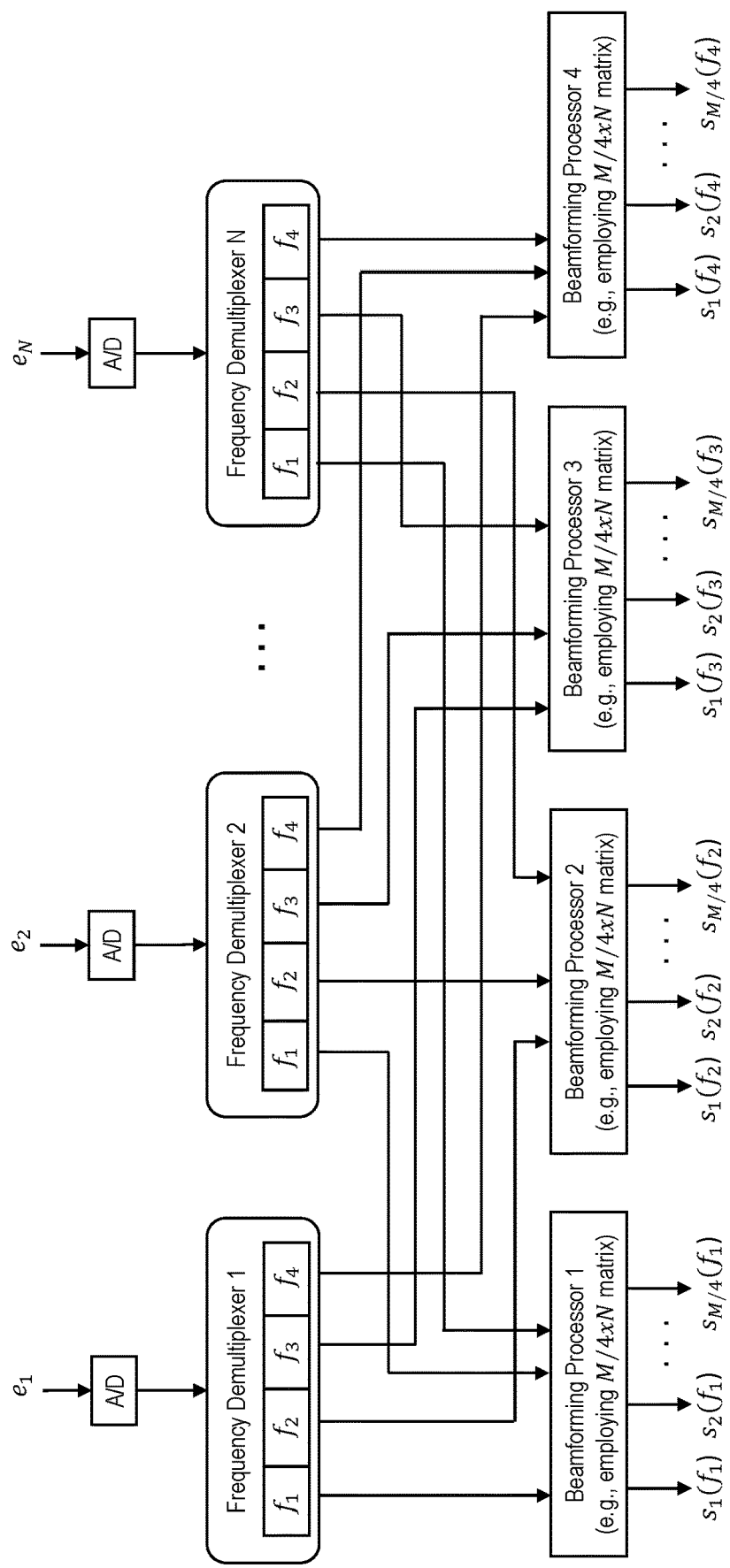
FIG. 3B illustrates a return link beamforming network architecture assuming a four-beam reuse scheme, in accordance with example embodiments of the present invention.

FIG. 3B illustrates an example return link beamforming network architecture, assuming a four-beam reuse scheme, in accordance with example embodiments of the present invention. The beamforming network architecture of FIG. 3B also employs four separate beamforming processors, each for processing the components of each element signal (received by a respective element of the satellite antenna) that were received via a one of the four beam types (e.g., frequency/polarization pairs). The beamforming processor 1 processes the signal components of the element signals from each of the antenna elements for the $f_1$ beam signals, the beamforming processor 2 processes the signal components of the element signals from each of the antenna elements for the $f_2$ beam signals, the beamforming processor 3 processes the signal components of the element signals from each of the antenna elements for the $f_3$ beam signals, and the beamforming processor 4 processes the signal components of the element signals from each of the antenna elements for the $f_4$ beam signals. Each of the element signals ($e_1, e_2, \ldots, e_N$) is first fed to a respective analog-to-digital converter (A/D), which converts the analog element signal into a digital signal at a sampling rate of 1.5*Y complex samples per second (where the total spectrum of each element signal is Y Hz.

Further, because each beamforming processor operates with respect to the element and beam signals for only a single one of the four beam types ($f_1, f_2, f_3, f_4$), the sampling rate for each resulting beam signal $s_i$ is 1.5*(Y/4) complex samples per second. Accordingly, each frequency demultiplexer downsamples the respective element signal by one-fourth. Further, because the total bandwidth of each element signal is four times the bandwidth of each beam signal, and each return link element signal includes a contribution from the component of the respective element signal associated with each of the beam types ($f_1, f_2, f_3, f_4$), each frequency demultiplexer also channelizes the respective element signal into the four respective frequency bands—the frequency demultiplexer 1 channelizes the element signal $e_1$ into the component element signals ($e_1(f_1), e_1(f_2), e_1,(f_3), e_1(f_4)$), the frequency demultiplexer 2 channelizes the element signal $e_2$ into the component element signals ($e_2(f_1), e_2(f_2), e_2, (f_3), e_2(f_4)$), etc. Each frequency demultiplexer then feeds the channelized component element signals to the respective beamforming processor—the component element signals ($e_1(f_1), e_2(f_i), \ldots, e_N(f_i)$) are fed by the frequency demultiplexers 1, 2, . . . , N, respectively, to the beamforming processor 1, the component element signals ($e_1(f_2), e_2(f_2), \ldots, e_N(f_2)$) are fed by the frequency demultiplexers 1, 2, . . . , N, respectively, to the beamforming processor 2, the component element signals ($e_1(f_3), e_2(f_3), \ldots, e_N(f_3)$) are fed by the frequency demultiplexers 1, 2, . . . , N, respectively, to the beamforming processor 3, and the component element signals ($e_1(f_4), e_2(f_4), \ldots e_N(f_4)$) are fed by the frequency demultiplexers 1, 2, . . . , N, respectively, to the beamforming processor 4. Each beamforming processor then performs the respective matrix operations to generate the respective beam signals ($s_1(f_1), s_2(f_i), \ldots, s_{M/4}(f_1)$).

As provided above, the components, methods, processes and approaches described herein may be processor-implemented using processing circuitry that may comprise one or more microprocessors, digital signal processors, application specific integrated circuits (ASICs), field programmable gate arrays (FPGAs), or other devices operable to be configured or programmed to implement the systems and/or methods described herein. Accordingly, as may be appropriate, some or all of the components depicted in the figures and described herein may be implemented via one or more processors or other such processing circuits (e.g., one or more ASICs), or a combination thereof. For example, the beamforming processors may be implemented in one or more ASICs (either individually in separate ASIC chips or combined in fewer ASIC chips). Also, the frequency multiplexers and demultiplexers may also be implemented in such a fashion using, for example ASICs and/or digital signal processors. Further, the depictions in the Figures of a component as a single block, or of multiple components as separate blocks, are provided for purposes of example only, and one of ordinary skill in the art may envision various different configurations for implementing the described approaches without departing from the scope of the intended embodiments of the present invention.

The beamforming approaches of example embodiments can be employed to produce a uniform allocation of capacity amongst the beams. As an example of a uniform resource allocation approach, the system can be assumed as comprising 8 beams with a frequency reuse scheme of 4 ($f_1, f_2, f_3, f_4$), with a satellite antenna having 5 elements or feeds. Additionally, for a uniform capacity allocation approach, example beam to frequency assignments may be as follows:

| | BEAM | | | | | | | |
|---|---|---|---|---|---|---|---|---|
| | Beam 1 | Beam 2 | Beam 3 | Beam 4 | Beam 5 | Beam 6 | Beam 7 | Beam 8 |
| FREQUENCY | $f_1$ | $f_2$ | $f_3$ | $f_4$ | $f_1$ | $f_2$ | $f_3$ | $f_4$ |

For this uniform allocation example, the beamforming matrix operation (4a)/(5a), for the forward link, can be expressed as follows (where the matrix entries $a_{x,y}$ represent the respective complex weights for the forward link beam steering):

$$\begin{bmatrix} e_1 \\ e_2 \\ e_3 \\ e_4 \\ e_5 \end{bmatrix} = \begin{bmatrix} a_{1,1} & a_{1,2} \\ a_{2,1} & a_{2,2} \\ a_{3,1} & a_{3,2} \\ a_{4,1} & a_{4,2} \\ a_{5,1} & a_{5,2} \end{bmatrix} \begin{bmatrix} s_1(f_1) \\ s_5(f_1) \end{bmatrix} + \begin{bmatrix} a_{1,3} & a_{1,4} \\ a_{2,3} & a_{2,4} \\ a_{3,3} & a_{3,4} \\ a_{4,3} & a_{4,4} \\ a_{5,3} & a_{5,4} \end{bmatrix} \begin{bmatrix} s_2(f_2) \\ s_6(f_2) \end{bmatrix} +$$

$$\begin{bmatrix} a_{1,5} & a_{1,6} \\ a_{2,5} & a_{2,6} \\ a_{3,5} & a_{3,6} \\ a_{4,5} & a_{4,6} \\ a_{5,5} & a_{5,6} \end{bmatrix} \begin{bmatrix} s_3(f_3) \\ s_7(f_3) \end{bmatrix} + \begin{bmatrix} a_{1,7} & a_{1,8} \\ a_{2,7} & a_{2,8} \\ a_{3,7} & a_{3,8} \\ a_{4,7} & a_{4,8} \\ a_{5,7} & a_{5,8} \end{bmatrix} \begin{bmatrix} s_4(f_4) \\ s_8(f_4) \end{bmatrix} =$$

$$\begin{bmatrix} a_{1,1}s_1(f_1) + a_{1,2}s_5(f_1) \\ a_{2,1}s_1(f_1) + a_{2,2}s_5(f_1) \\ a_{3,1}s_1(f_1) + a_{3,2}s_5(f_1) \\ a_{4,1}s_1(f_1) + a_{4,2}s_5(f_1) \\ a_{5,1}s_1(f_1) + a_{5,2}s_5(f_1) \end{bmatrix} + \begin{bmatrix} a_{1,3}s_2(f_2) + a_{1,4}s_6(f_2) \\ a_{2,3}s_2(f_2) + a_{2,4}s_6(f_2) \\ a_{3,3}s_2(f_2) + a_{3,4}s_6(f_2) \\ a_{4,3}s_2(f_2) + a_{4,4}s_6(f_2) \\ a_{5,3}s_2(f_2) + a_{5,4}s_6(f_2) \end{bmatrix} +$$

$$\begin{bmatrix} a_{1,5}s_3(f_3) + a_{1,6}s_7(f_3) \\ a_{2,5}s_3(f_3) + a_{2,6}s_7(f_3) \\ a_{3,5}s_3(f_3) + a_{3,6}s_7(f_3) \\ a_{4,5}s_3(f_3) + a_{4,6}s_7(f_3) \\ a_{5,5}s_3(f_3) + a_{5,6}s_7(f_3) \end{bmatrix} + \begin{bmatrix} a_{1,7}s_4(f_4) + a_{1,8}s_8(f_4) \\ a_{2,7}s_4(f_4) + a_{2,8}s_8(f_4) \\ a_{3,7}s_4(f_4) + a_{3,8}s_8(f_4) \\ a_{4,7}s_4(f_4) + a_{4,8}s_8(f_4) \\ a_{5,7}s_4(f_4) + a_{5,8}s_8(f_4) \end{bmatrix} =$$

$$\begin{bmatrix} e_1(f_1) + e_1(f_2) + e_1(f_3) + e_1(f_4) \\ e_2(f_1) + e_2(f_2) + e_2(f_3) + e_2(f_4) \\ e_3(f_1) + e_3(f_2) + e_3(f_3) + e_3(f_4) \\ e_4(f_1) + e_4(f_2) + e_4(f_3) + e_4(f_4) \\ e_5(f_1) + e_5(f_2) + e_5(f_3) + e_5(f_4) \end{bmatrix}$$

Figure 4A:
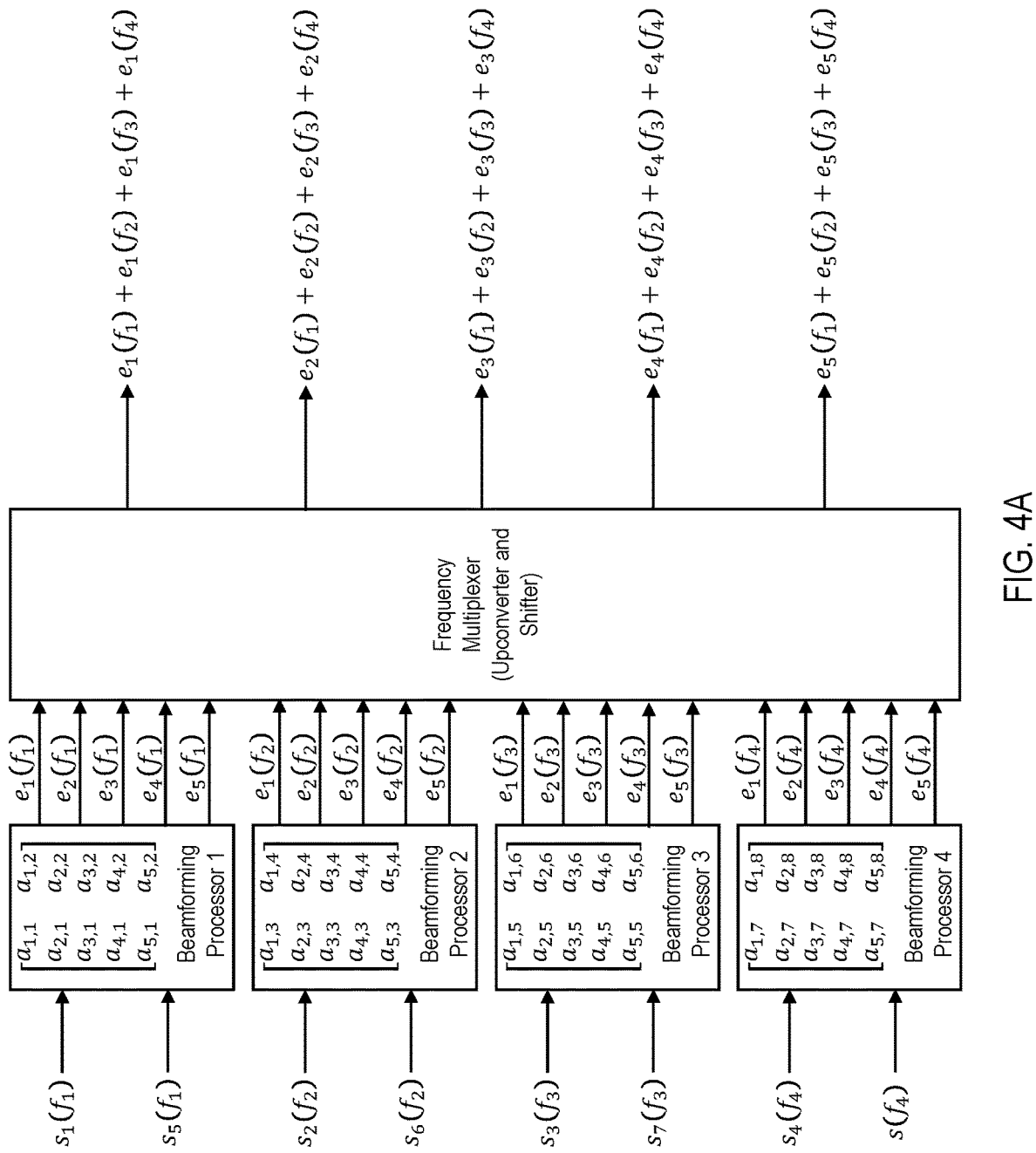
FIG. 4A illustrates an example of the forward link beamforming network architecture of FIG. 3A for a uniform capacity allocation, in accordance with example embodiments of the present invention.

FIG. 4A illustrates an example of the forward link beamforming network architecture of FIG. 3A for this uniform allocation example.

Further, for this uniform allocation example, the beamforming matrix operations (4b)/(5b), for the return link, can be expressed as follows (where the matrix entries $b_{x,y}$ represent the respective complex weights for the return link beams):

$$\begin{bmatrix} s_1(f_1) \\ s_5(f_1) \end{bmatrix} = \begin{bmatrix} b_{1,1} & b_{1,2} & b_{1,3} & b_{1,4} & b_{1,5} \\ b_{5,1} & b_{5,2} & b_{5,3} & b_{5,4} & b_{5,5} \end{bmatrix} \begin{bmatrix} e_1(f_1) \\ e_2(f_1) \\ e_3(f_1) \\ e_4(f_1) \\ e_5(f_1) \end{bmatrix} =$$

$$\begin{bmatrix} b_{1,1}e_1(f_1) + b_{1,2}e_2(f_1) + b_{1,3}e_3(f_1) + b_{1,4}e_4(f_1) + b_{1,5}e_5(f_1) \\ b_{5,1}e_1(f_1) + b_{5,2}e_2(f_1) + b_{5,3}e_3(f_1) + b_{5,4}e_4(f_1) + b_{5,5}e_5(f_1) \end{bmatrix}$$

$$\begin{bmatrix} s_2(f_2) \\ s_6(f_2) \end{bmatrix} = \begin{bmatrix} b_{2,1} & b_{2,2} & b_{2,3} & b_{2,4} & b_{2,5} \\ b_{6,1} & b_{6,2} & b_{6,3} & b_{6,4} & b_{6,5} \end{bmatrix} \begin{bmatrix} e_1(f_2) \\ e_2(f_2) \\ e_3(f_2) \\ e_4(f_2) \\ e_5(f_2) \end{bmatrix} =$$

$$\begin{bmatrix} b_{2,1}e_1(f_2) + b_{2,2}e_2(f_2) + b_{2,3}e_3(f_2) + b_{2,4}e_4(f_2) + b_{2,5}e_5(f_2) \\ b_{6,1}e_1(f_2) + b_{6,2}e_2(f_2) + b_{6,3}e_3(f_2) + b_{6,4}e_4(f_2) + b_{6,5}e_5(f_2) \end{bmatrix}$$

$$\begin{bmatrix} s_3(f_3) \\ s_7(f_3) \end{bmatrix} = \begin{bmatrix} b_{3,1} & b_{3,2} & b_{3,3} & b_{3,4} & b_{3,5} \\ b_{7,1} & b_{7,2} & b_{7,3} & b_{7,4} & b_{7,5} \end{bmatrix} \begin{bmatrix} e_1(f_3) \\ e_2(f_3) \\ e_3(f_3) \\ e_4(f_3) \\ e_5(f_3) \end{bmatrix} =$$

$$\begin{bmatrix} b_{3,1}e_1(f_3) + b_{3,2}e_2(f_3) + b_{3,3}e_3(f_3) + b_{3,4}e_4(f_3) + b_{3,5}e_5(f_3) \\ b_{7,1}e_1(f_3) + b_{7,2}e_2(f_3) + b_{7,3}e_3(f_3) + b_{7,4}e_4(f_3) + b_{7,5}e_5(f_3) \end{bmatrix}$$

$$\begin{bmatrix} s_4(f_4) \\ s_8(f_4) \end{bmatrix} = \begin{bmatrix} b_{4,1} & b_{4,2} & b_{4,3} & b_{4,4} & b_{4,5} \\ b_{8,1} & b_{8,2} & b_{8,3} & b_{8,4} & b_{8,5} \end{bmatrix} \begin{bmatrix} e_1(f_4) \\ e_2(f_4) \\ e_3(f_4) \\ e_4(f_4) \\ e_5(f_4) \end{bmatrix} =$$

$$\begin{bmatrix} b_{4,1}e_1(f_4) + b_{4,2}e_2(f_4) + b_{4,3}e_3(f_4) + b_{4,4}e_4(f_4) + b_{4,5}e_5(f_4) \\ b_{8,1}e_1(f_4) + b_{8,2}e_2(f_4) + b_{8,3}e_3(f_4) + b_{8,4}e_4(f_4) + b_{8,5}e_5(f_4) \end{bmatrix}$$

Figure 4B:
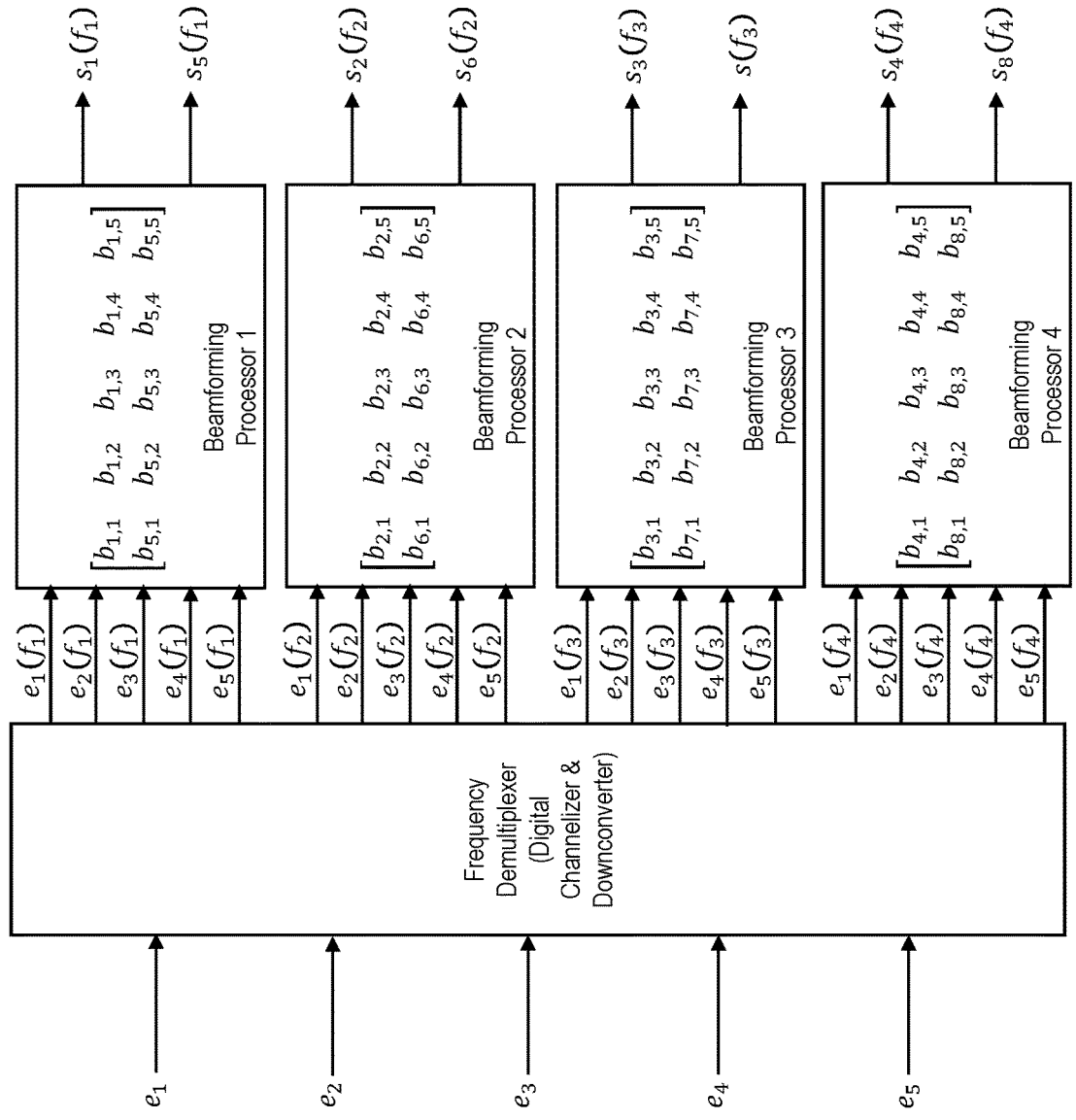
FIG. 4B illustrates an example of the return link beamforming network architecture of FIG. 3B for a uniform capacity allocation, in accordance with example embodiments of the present invention.

FIG. 4B illustrates an example of the return link beamforming network architecture of FIG. 3B for this uniform allocation example.

The beamforming approaches of example embodiments can also be employed to produce a nonuniform allocation of capacity amongst the beams. As an example of a nonuniform resource allocation approach, the system can again be assumed as comprising 8 beams with a frequency reuse scheme of 4 ($f_1$, $f_2$, $f_3$, $f_4$), with a satellite antenna having 5 elements or feeds. Additionally, for a nonuniform capacity allocation approach, an example beam to frequency assignments may be as follows:

| | BEAM | | | | | | | |
|---|---|---|---|---|---|---|---|---|
| | Beam 1 | Beam 2 | Beam 3 | Beam 4 | Beam 5 | Beam 6 | Beam 7 | Beam 8 |
| FREQUENCY | $f_1$, $f_2$, $f_3$, $f_4$ | | | | $f_1$ | $f_2$ | $f_3$ | $f_4$ |

For this nonuniform allocation example, the beamforming matrix operation (4) can be expressed as follows (where the matrix entries $a_{x,y}$ represent the respective complex weights for the forward link beam steering):

$$\begin{bmatrix} e_1 \\ e_2 \\ e_3 \\ e_4 \\ e_5 \end{bmatrix} = \begin{bmatrix} a_{1,1} & a_{1,2} \\ a_{2,1} & a_{2,2} \\ a_{3,1} & a_{3,2} \\ a_{4,1} & a_{4,2} \\ a_{5,1} & a_{5,2} \end{bmatrix} \begin{bmatrix} s_1(f_1) \\ s_5(f_1) \end{bmatrix} + \begin{bmatrix} a_{1,1} & a_{1,4} \\ a_{2,1} & a_{2,4} \\ a_{3,1} & a_{3,4} \\ a_{4,1} & a_{4,4} \\ a_{5,1} & a_{5,4} \end{bmatrix} \begin{bmatrix} s_1(f_2) \\ s_6(f_2) \end{bmatrix} +$$

$$\begin{bmatrix} a_{1,1} & a_{1,6} \\ a_{2,1} & a_{2,6} \\ a_{3,1} & a_{3,6} \\ a_{4,1} & a_{4,6} \\ a_{5,1} & a_{5,6} \end{bmatrix} \begin{bmatrix} s_1(f_3) \\ s_7(f_3) \end{bmatrix} + \begin{bmatrix} a_{1,1} & a_{1,8} \\ a_{2,1} & a_{2,8} \\ a_{3,1} & a_{3,8} \\ a_{4,1} & a_{4,8} \\ a_{5,1} & a_{5,8} \end{bmatrix} \begin{bmatrix} s_1(f_4) \\ s_8(f_4) \end{bmatrix} =$$

$$\begin{bmatrix} a_{1,1}s_1(f_1) + a_{1,2}s_5(f_1) \\ a_{2,1}s_1(f_1) + a_{2,2}s_5(f_1) \\ a_{3,1}s_1(f_1) + a_{3,2}s_5(f_1) \\ a_{4,1}s_1(f_1) + a_{4,2}s_5(f_1) \\ a_{5,1}s_1(f_1) + a_{5,2}s_5(f_1) \end{bmatrix} + \begin{bmatrix} a_{1,1}s_1(f_2) + a_{1,4}s_6(f_2) \\ a_{2,1}s_1(f_2) + a_{2,4}s_6(f_2) \\ a_{3,1}s_1(f_2) + a_{3,4}s_6(f_2) \\ a_{4,1}s_1(f_2) + a_{4,4}s_6(f_2) \\ a_{5,1}s_1(f_2) + a_{5,4}s_6(f_2) \end{bmatrix} +$$

$$\begin{bmatrix} a_{1,1}s_1(f_3) + a_{1,6}s_7(f_3) \\ a_{2,1}s_1(f_3) + a_{2,6}s_7(f_3) \\ a_{3,1}s_1(f_3) + a_{3,6}s_7(f_3) \\ a_{4,1}s_1(f_3) + a_{4,6}s_7(f_3) \\ a_{5,1}s_1(f_3) + a_{5,6}s_7(f_3) \end{bmatrix} + \begin{bmatrix} a_{1,1}s_1(f_4) + a_{1,8}s_8(f_4) \\ a_{2,1}s_1(f_4) + a_{2,8}s_8(f_4) \\ a_{3,1}s_1(f_4) + a_{3,8}s_8(f_4) \\ a_{4,1}s_1(f_4) + a_{4,8}s_8(f_4) \\ a_{5,1}s_1(f_4) + a_{5,8}s_8(f_4) \end{bmatrix} =$$

$$\begin{bmatrix} e_1(f_1) + e_1(f_2) + e_1(f_3) + e_1(f_4) \\ e_2(f_1) + e_2(f_2) + e_2(f_3) + e_2(f_4) \\ e_3(f_1) + e_3(f_2) + e_3(f_3) + e_3(f_4) \\ e_4(f_1) + e_4(f_2) + e_4(f_3) + e_4(f_4) \\ e_5(f_1) + e_5(f_2) + e_5(f_3) + e_5(f_4) \end{bmatrix}$$

Figure 4C:
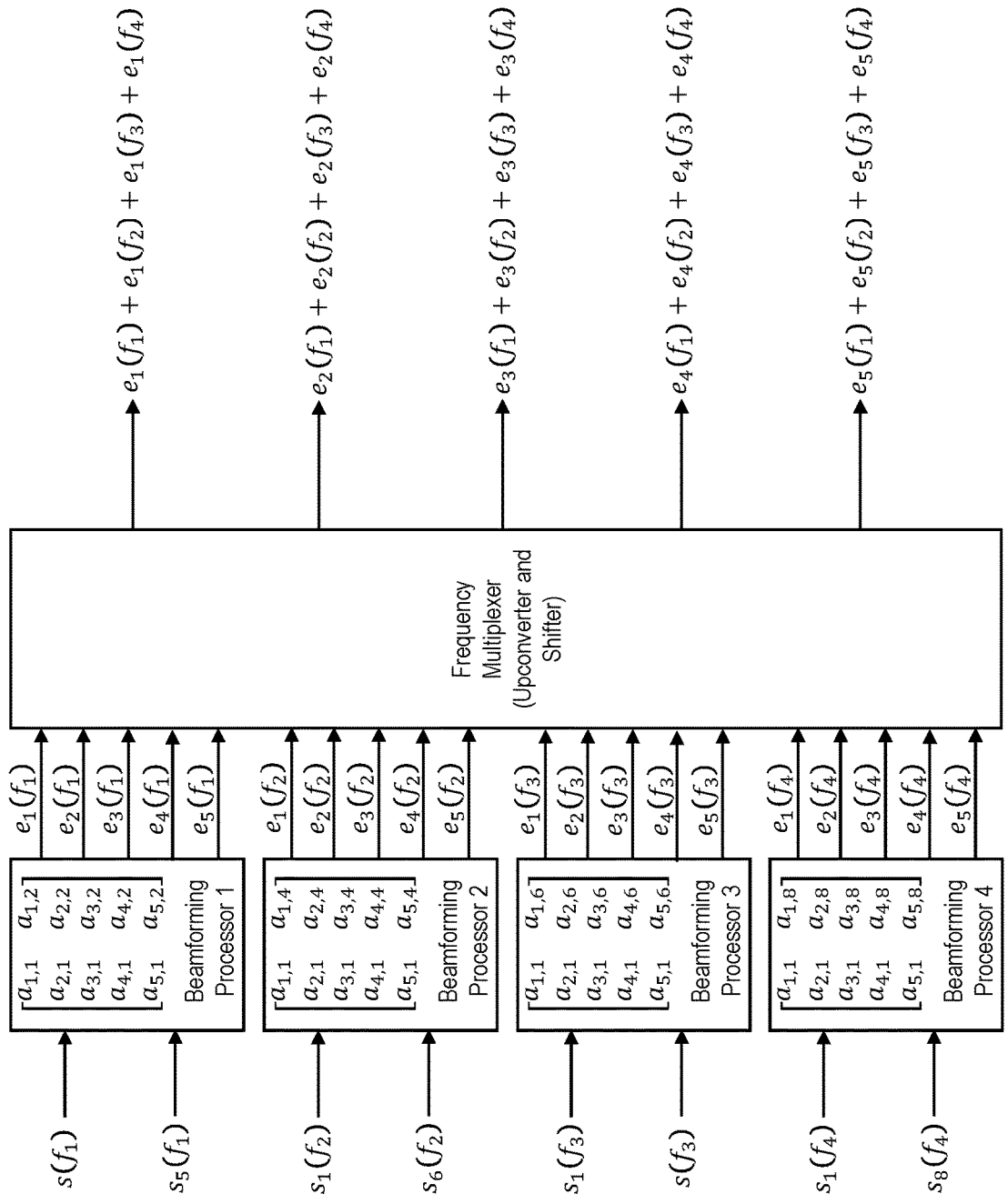
FIG. 4C illustrates an example of the forward link beamforming network architecture of FIG. 3A for a nonuniform capacity allocation, in accordance with example embodiments of the present invention.

FIG. 4C illustrates an example of the forward link beamforming network architecture of FIG. 3A for this nonuniform allocation example.

Further, for this nonuniform allocation example, the beamforming matrix operation (4b), for the return link, can be expressed as follows (where the matrix entries $b_{x,y}$ represent the respective complex weights for the return link beams):

$$\begin{bmatrix} s_1(f_1) \\ s_5(f_1) \end{bmatrix} = \begin{bmatrix} b_{1,1} & b_{1,2} & b_{1,3} & b_{1,4} & b_{1,5} \\ b_{5,1} & b_{5,2} & b_{5,3} & b_{5,4} & b_{5,5} \end{bmatrix} \begin{bmatrix} e_1(f_1) \\ e_2(f_1) \\ e_3(f_1) \\ e_4(f_1) \\ e_5(f_1) \end{bmatrix} =$$

$$\begin{bmatrix} b_{1,1}e_1(f_1) + b_{1,2}e_2(f_1) + b_{1,3}e_3(f_1) + b_{1,4}e_4(f_1) + b_{1,5}e_5(f_1) \\ b_{5,1}e_1(f_1) + b_{5,2}e_2(f_1) + b_{5,3}e_3(f_1) + b_{5,4}e_4(f_1) + b_{5,5}e_5(f_1) \end{bmatrix}$$

$$\begin{bmatrix} s_1(f_2) \\ s_6(f_2) \end{bmatrix} = \begin{bmatrix} b_{1,1} & b_{1,2} & b_{1,3} & b_{1,4} & b_{1,5} \\ b_{6,1} & b_{6,2} & b_{6,3} & b_{6,4} & b_{6,5} \end{bmatrix} \begin{bmatrix} e_1(f_2) \\ e_2(f_2) \\ e_3(f_2) \\ e_4(f_2) \\ e_5(f_2) \end{bmatrix} =$$

$$\begin{bmatrix} b_{1,1}e_1(f_2) + b_{1,2}e_2(f_2) + b_{1,3}e_3(f_2) + b_{1,4}e_4(f_2) + b_{1,5}e_5(f_2) \\ b_{6,1}e_1(f_2) + b_{6,2}e_2(f_2) + b_{6,3}e_3(f_2) + b_{6,4}e_4(f_2) + b_{6,5}e_5(f_2) \end{bmatrix}$$

$$\begin{bmatrix} s_1(f_3) \\ s_7(f_3) \end{bmatrix} = \begin{bmatrix} b_{1,1} & b_{1,2} & b_{1,3} & b_{1,4} & b_{1,5} \\ b_{7,1} & b_{7,2} & b_{7,3} & b_{7,4} & b_{7,5} \end{bmatrix} \begin{bmatrix} e_1(f_3) \\ e_2(f_3) \\ e_3(f_3) \\ e_4(f_3) \\ e_5(f_3) \end{bmatrix} =$$

$$\begin{bmatrix} b_{1,1}e_1(f_3) + b_{1,2}e_2(f_3) + b_{1,3}e_3(f_3) + b_{1,4}e_4(f_3) + b_{1,5}e_5(f_3) \\ b_{7,1}e_1(f_3) + b_{7,2}e_2(f_3) + b_{7,3}e_3(f_3) + b_{7,4}e_4(f_3) + b_{7,5}e_5(f_3) \end{bmatrix}$$

$$\begin{bmatrix} s_1(f_4) \\ s_8(f_4) \end{bmatrix} = \begin{bmatrix} b_{1,1} & b_{1,2} & b_{1,3} & b_{1,4} & b_{1,5} \\ b_{8,1} & b_{8,2} & b_{8,3} & b_{8,4} & b_{8,5} \end{bmatrix} \begin{bmatrix} e_1(f_4) \\ e_2(f_4) \\ e_3(f_4) \\ e_4(f_4) \\ e_5(f_4) \end{bmatrix} =$$

$$\begin{bmatrix} b_{1,1}e_1(f_4) + b_{1,2}e_2(f_4) + b_{1,3}e_3(f_4) + b_{1,4}e_4(f_4) + b_{1,5}e_5(f_4) \\ b_{8,1}e_1(f_4) + b_{8,2}e_2(f_4) + b_{8,3}e_3(f_4) + b_{8,4}e_4(f_4) + b_{8,5}e_5(f_4) \end{bmatrix}$$

Figure 4D:
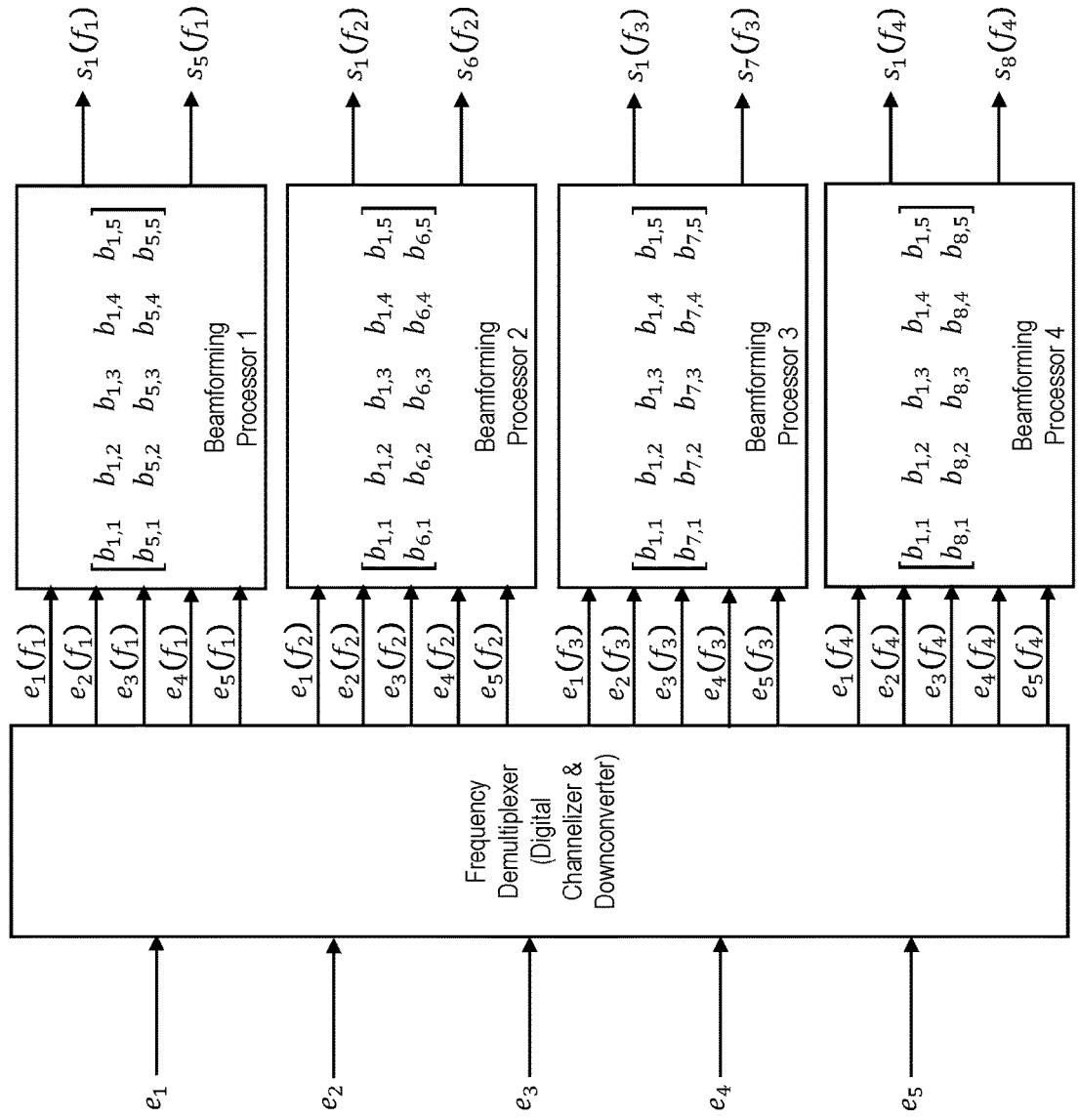
FIG. 4D illustrates an example of the return link beamforming network architecture of FIG. 3B for a nonuniform capacity allocation, in accordance with example embodiments of the present invention.

FIG. 4D illustrates an example of the return link beamforming network architecture of FIG. 3B for this nonuniform allocation example.

Figure 5:
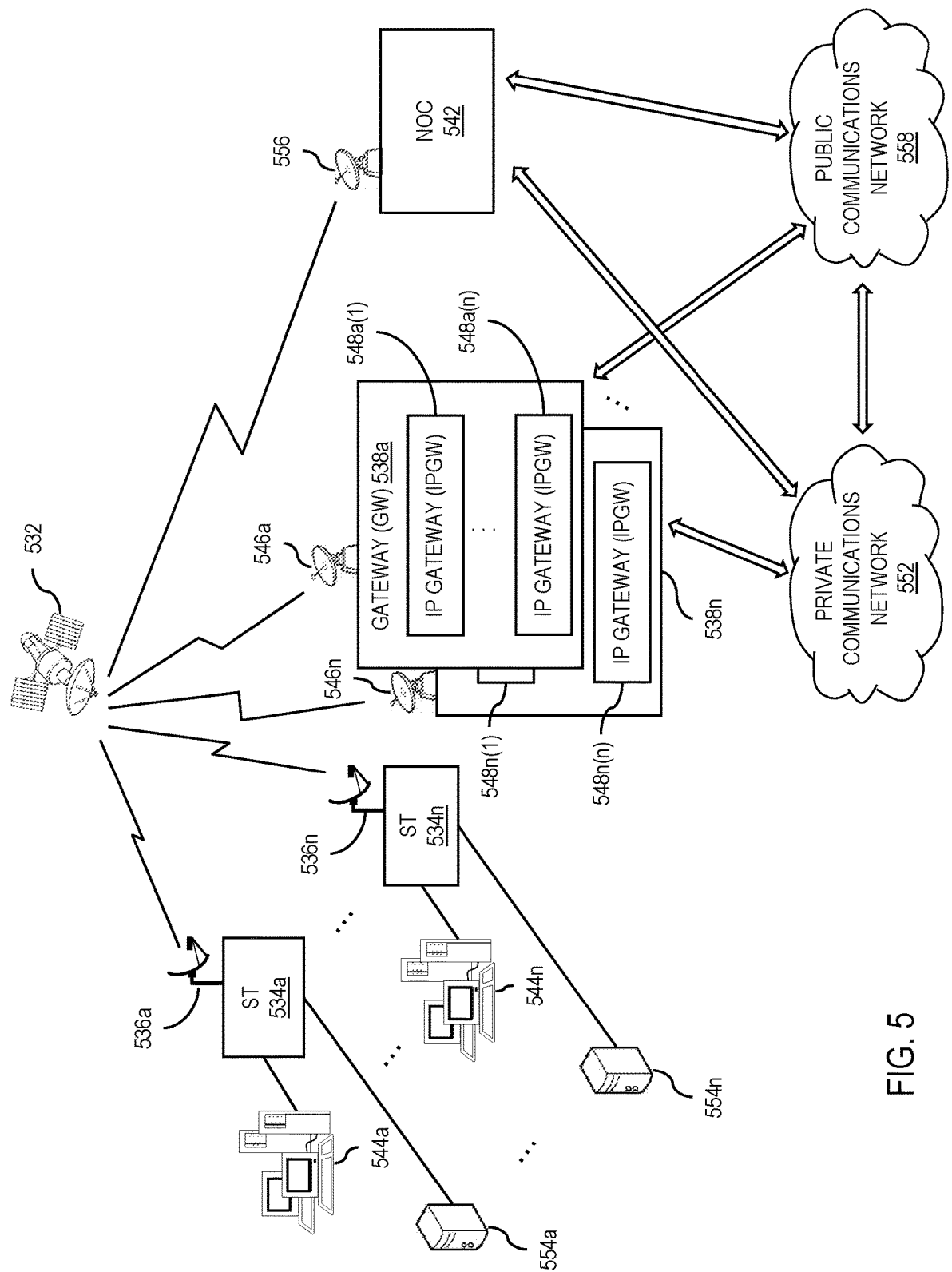
FIG. 5 illustrates an example satellite communications system configured to provide a beamforming approach, in accordance with example embodiments of the present invention.

FIG. 5 illustrates an example wireless communications system configured to provide a beamforming approach, in accordance with example embodiments of the present invention. The satellite communications system includes one or more satellites (of which only one is shown in the Figure—the satellite 532) that support communications among multiple satellite terminals (STs) 534a-534n, a number of gateways (GWs) 538a-538n, and a network operations center (NOC) 542. The STs, GWs and NOC transmit and receive signals via the antennas 536a-536n, 546a-546n, and 556, respectively. According to different embodiments, the NOC 542 may reside at a separate site reachable via a separate satellite channel or may reside within a GW site. The NOC 542 performs the management plane functions of the system 530, while the GWs 538a-538n perform the data plane functions of the system 530. For example, the NOC 542 performs such functions as network management and configuration, software downloads (e.g., to the STs 534a-534n), status monitoring, statistics functions (e.g., collection, aggregation and reporting), security functions (e.g., key generation, management and distribution), ST registration and authentication, and GW diversity management. The NOC 542 communicates with each GW via the satellite, or via a secure private communications network 552 (e.g., an IPsec tunnel over a dedicated link or a virtual private network (VPN) or IPsec tunnel through a public network, such as the Internet). Additionally, each GW and the NOC have connectivity to one or more public communications networks, such as the Internet or a PSTN. Further, according to example embodiments, a gateway 538 may include a beamforming system according to one or more embodiments of the present invention, and may thereby control the beamforming for the outroutes (forward links) and inroutes (return links) for the beam pattern over the geographic area serviced by the satellite. The terminology "inroute" (or return link) refers to a data communications link from an ST to a respective GW over a respective satellite, and the term "outroute" (or forward link) refers to a link from a GW to one or more STs over a respective satellite. While the system is a satellite communications system, example embodiments may be employed in any type of wireless communications system comprising one or more airborne communications vehicles that employ wireless transmissions to and from the ground via spotbeams generated by an element array antenna (e.g., a satellite communications system, a high altitude platform (HAP) communications system, etc.).

According to a further example embodiment, each of the GWs 538a-538n include one or more IP gateways (IP-GWs)—whereby the data plane functions are divided between a GW and its respective IPGWs. For example, GW 538a includes IPGWs 548a(1)-548a(n) and GW 538n includes IPGWs 548n(1)-548n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement.

The communications system operates as a bent-pipe system, where the satellite essentially operates as a repeater or bent pipe. In a bent-pipe system, the satellite operates as a repeater or bent pipe, and communications to and from the STs 534a-534n are transmitted over the satellite to and from respective IPGWs associated with particular STs. Further, in a spotbeam system, any one spotbeam operates as a bent-pipe to geographic region covered by the beam. For example, each spotbeam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spotbeams of the satellite, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks). More specifically, for a data communication from ST 534a to a public communications network 558 (e.g., the Internet), the ST 534a is associated with an IPGW (e.g., IPGW 548a(1)—selected from a pool of IPGWs available to the ST 534a, such as IPGWs 548a(1)-548a(7)—where the pool of IPGWs is a suitable subset of the IPGWs 548a(1)-548a(n) located at the GW 538a). The data is first transmitted, via the satellite, from the ST 534a to associated IPGW 548a(1). The IPGW 548a(1) determines the destination as being the Internet 558. The IPGW then repackages the data (e.g., as a TCP/IP communication), and routes the data communication, via the terrestrial link 564, to the Internet 558.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A beamforming apparatus comprising:
   x beamforming processors; and
   N frequency multiplexers; and
   wherein each beamforming processor is configured to receive M/x beam signals, wherein each beam signal is configured to carry data for transmission via a respective spotbeam of a multi-spotbeam beam pattern of an N element multi-element array antenna, wherein the multi-spotbeam beam pattern is configured to employ M such spotbeams in a beam pattern with a frequency reuse of x beam-types and wherein the M/x beam signals that each beamforming processor is configured to receive is each configured for transmission via a same respective beam-type;
   wherein each frequency multiplexer is configured to generate an element signal for transmission by a respective element of the multi-element array antenna;
   wherein each beamforming processor is further configured to generate N component element signals by applying a respective array of weight factors to the respective M/x beam signals received by it, wherein the array of weight factors is configured such that each of the N component element signals generated by the beamforming processor forms a component of a respective one of the element signals generated by a respective one of the frequency multiplexers, and to provide each of the N component element signals to the respective one of the frequency multiplexers;
   wherein the generation of the element signal by each frequency multiplexer is based on the respective component element signals provided to it by the x beamforming processors;
   wherein x, N and M are positive numbers; and
   wherein each array of weight factors applied by a respective beamforming processor is also configured such that the transmission of all of the element signals by the respective elements of the multi-element array antenna will generate the spotbeam pattern.

2. The beamforming apparatus according to claim 1, wherein the beamforming system is configured to be located within a gateway node of a wireless communications system.

3. The beamforming apparatus according to claim 1, wherein the beamforming system is configured to be located within an airborne communications platform of a wireless communications system.

4. The beamforming apparatus according to claim 1, wherein each beam-type is configured to be based on a unique respective signal frequency and polarization pair.

5. The beamforming apparatus according to claim 1, wherein the beamforming system is configured to dynamically adapt the configuration of the multi-spotbeam beam pattern by generating the element signals at a respective generation frequency and configuring the respective array of weight factors for each beamforming processor for any given point in time of the generation frequency for the generation of a desired configuration of the beam pattern for the respective point in time.

6. A method for beamforming comprising:
receiving, by each of x beamforming processors of a beamforming system, M/x beam signals, wherein each beam signal is configured to carry data for transmission via a respective spotbeam of a multi-spotbeam beam pattern of an N element multi-element array antenna, wherein the multi-spotbeam beam pattern is configured to employ M such spotbeams in a beam pattern with a frequency reuse of x beam-types and wherein the M/x beam signals that each beamforming processor receives is each configured for transmission via a same respective beam-type;
generating, by each of N frequency multiplexers, an element signal for transmission by a respective element of the multi-element array antenna; and
generating, by each of the x beamforming processors, N component element signals by applying a respective array of weight factors to the respective M/x beam signals received by it, wherein the array of weight factors is configured such that each of the N component element signals generated by the beamforming processor forms a component of a respective one of the element signals generated by a respective one of the frequency multiplexers, and providing each of the N component element signals to the respective one of the frequency multiplexers; and
wherein the generation of the element signal by each frequency multiplexer is based on the respective component element signals provided to it by the x beamforming processors;
wherein x, N and M are positive numbers; and
wherein each array of weight factors applied by a respective beamforming processor is also configured such that the transmission of all of the element signals by the respective elements of the multi-element array antenna will generate the spotbeam pattern.

7. The beamforming method according to claim 6, wherein the beamforming system is located within an airborne communications platform of a wireless communications system.

8. The beamforming method according to claim 6, wherein each beam-type is configured to be based on a unique respective signal frequency and polarization pair.

9. The beamforming method according to claim 6, wherein the configuration of the multi-spotbeam beam pattern is dynamically adaptable by generating the element signals at a respective generation frequency and configuring the respective array of weight factors for each beamforming processor for any given point in time of the generation frequency for the generation of a desired configuration of the beam pattern for the respective point in time.

10. The beamforming method according to claim 6, wherein the beamforming system is located within a gateway node of a wireless communications system.

11. The beamforming method according to claim 10, further comprising:
transmitting, by the gateway node, the element signals generated by the N frequency multiplexers of the beamforming system to an airborne communications platform of the wireless communications system on which the multi-element array antenna is located.

12. The beamforming method according to claim 11, further comprising:
generating, by the multi-element array antenna, the multi-spotbeam beam pattern based on the element signals received from the gateway node.

13. A wireless communications system comprising:
a beamforming system that comprises x beamforming processors, and N frequency multiplexers;
a gateway node; and
an airborne communications platform that comprises an N element multi-element array antenna; and
wherein each beamforming processor is configured to receive M/x beam signals;
wherein each beam signal is configured to carry data for transmission via a respective spotbeam of the multi-spotbeam beam pattern of the N element multi-element array antenna;
wherein the multi-spotbeam beam pattern is configured to employ M such spotbeams in a beam pattern with a frequency reuse of x beam-types and wherein the M/x beam signals that each beamforming processor is configured to receive is each configured for transmission via a same respective beam-type;
wherein each frequency multiplexer is configured to generate an element signal for transmission by a respective element of the multi-element array antenna;
wherein each beamforming processor is further configured to generate N component element signals by applying a respective array of weight factors to the respective M/x beam signals received by it, wherein the array of weight factors is configured such that each of the N component element signals generated by the beamforming processor forms a component of a respective one of the element signals generated by a respective one of the frequency multiplexers, and to provide each of the N component element signals to the respective one of the frequency multiplexers;
wherein the generation of the element signal by each frequency multiplexer is based on the respective component element signals provided to it by the x beamforming processors;
wherein x, N and M are positive numbers; and
wherein each array of weight factors applied by a respective beamforming processor is also configured such that the transmission of all of the element signals by the respective elements of the multi-element array antenna will generate the spotbeam pattern.

14. The wireless communications system according to claim 13, wherein each beam-type is configured to be based on a unique respective signal frequency and polarization pair.

15. The wireless communications system according to claim 13, wherein the beamforming system is configured to dynamically adapt the configuration of the multi-spotbeam beam pattern by generating the element signals at a respective generation frequency and configuring the respective array of weight factors for each beamforming processor for any given point in time of the generation frequency for the generation of a desired configuration of the beam pattern for the respective point in time.

16. The wireless communications system according to claim 13, wherein the beamforming system is configured to be located within a gateway node of the wireless communications system.

17. The wireless communications system according to claim 16, wherein the gateway node is configured to transmit the element signals generated by the N frequency multiplexers of the beamforming system to the airborne communications platform.

18. The wireless communications system according to claim 17, wherein the multi-element array antenna is configured to generate the multi-spotbeam beam pattern based on the element signals received from the gateway node.

19. The wireless communications system according to claim 18, wherein the beamforming system is configured to dynamically adapt the configuration of the multi-spotbeam beam pattern by generating the element signals at a respective generation frequency and configuring the respective array of weight factors for each beamforming processor for any given point in time of the generation frequency for the generation of a desired configuration of the beam pattern for the respective point in time.

20. The wireless communications system according to claim 13, wherein the beamforming system is configured to be located within the airborne communications platform.

21. The wireless communications system according to claim 20, wherein the gateway node is configured to determine the respective array of weight factors for each beamforming processor, and to transmit the respective array of weight factors for each beamforming processor to the airborne communications platform.

22. The wireless communications system according to claim 21, wherein the multi-element array antenna is configured to generate the multi-spotbeam beam pattern based on the element signals generated by the N frequency multiplexers.

23. The wireless communications system according to claim 22, wherein the gateway node is configured to dynamically adapt the configuration of the multi-spotbeam beam pattern by generating the element signals at a respective generation frequency and configuring the respective array of weight factors for each beamforming processor for any given point in time of the generation frequency for the generation of a desired configuration of the beam pattern for the respective point in time.

* * * * *